United States Patent
Sakamoto et al.

(10) Patent No.: US 11,136,659 B2
(45) Date of Patent: Oct. 5, 2021

(54) SURFACE-TREATED STEEL MATERIAL

(71) Applicant: NIPPON STEEL COATED SHEET CORPORATION, Tokyo (JP)

(72) Inventors: Toshiaki Sakamoto, Tokyo (JP); Yoichi Tozaki, Tokyo (JP); Hiromasa Nomura, Tokyo (JP); Tomonari Hamamura, Tokyo (JP); Hideaki Nasu, Tokyo (JP)

(73) Assignee: NIPPON STEEL COATED SHEET CORPORATION, Tokyo (JP)

( * ) Notice: Subject to any disclaimer, the term of this patent is extended or adjusted under 35 U.S.C. 154(b) by 0 days.

(21) Appl. No.: 15/766,639

(22) PCT Filed: Mar. 7, 2017

(86) PCT No.: PCT/JP2017/009035
§ 371 (c)(1),
(2) Date: Apr. 6, 2018

(87) PCT Pub. No.: WO2017/187799
PCT Pub. Date: Nov. 2, 2017

(65) Prior Publication Data
US 2018/0305802 A1 Oct. 25, 2018

(30) Foreign Application Priority Data
Apr. 26, 2016 (JP) .............................. JP2016-088071

(51) Int. Cl.
*C23C 2/26* (2006.01)
*C23C 2/12* (2006.01)
(Continued)

(52) U.S. Cl.
CPC ............. *C23C 2/26* (2013.01); *B32B 15/01* (2013.01); *B32B 15/012* (2013.01); *B32B 15/013* (2013.01); *B32B 15/04* (2013.01); *B32B 15/043* (2013.01); *B32B 15/08* (2013.01); *B32B 15/09* (2013.01); *B32B 15/092* (2013.01); *B32B 15/18* (2013.01); *C09D 5/084* (2013.01); *C22C 18/04* (2013.01); *C22C 21/10* (2013.01); *C23C 2/06* (2013.01); *C23C 2/12* (2013.01); *C23C 2/28* (2013.01); *C23C 2/40* (2013.01); *C23C 22/40* (2013.01); *C23C 22/42* (2013.01); *C23C 22/60* (2013.01); *C23C 28/00* (2013.01); *C23C 28/021* (2013.01); *C23C 28/023* (2013.01); *C23C 28/025* (2013.01); *C23C 28/321* (2013.01); *C23C 28/322* (2013.01); *C23C 28/3225* (2013.01); *C23C 28/34* (2013.01); *C23C 30/00* (2013.01); *C23C 30/005* (2013.01); *Y10T 428/12556* (2015.01);
(Continued)

(58) Field of Classification Search
CPC ........... C23C 2/26; C23C 28/00; C23C 22/42; C23C 2/12; C23C 2/06; C23C 2/40; C23C 2/28; C23C 22/40; C23C 22/60; C23C 28/021; C23C 28/025; C23C 28/023; C23C 30/00; C23C 30/005; C23C 28/321; C23C 28/3225; C23C 28/322; C23C 28/34; C22C 18/04; C22C 21/10; Y10T 428/12556; Y10T 428/12569; Y10T 428/12757; Y10T 428/12779; Y10T 428/12972; Y10T 428/12979; Y10T 428/24967; Y10T 428/263; Y10T 428/264; Y10T 428/265; Y10T 428/12799; B32B 15/01; B32B 15/012; B32B 15/013; B32B 15/04; B32B 15/043; B32B 15/08; B32B 15/09; B32B 15/092; B32B 15/18; C09D 5/084
See application file for complete search history.

(56) References Cited

U.S. PATENT DOCUMENTS 9,080,231 B2  7/2015  Fujii et al.
9,598,759 B2  3/2017  Nakano et al.
(Continued)

FOREIGN PATENT DOCUMENTS

| CN | 103748253 | 4/2014 |
|---|---|---|
| JP | 5-50444 | 3/1993 |
| JP | 11-279735 | 10/1999 |
| JP | 3461741 | 10/2003 |
| JP | 4323530 | 9/2009 |

(Continued)

OTHER PUBLICATIONS

Machine Translation, Tozaki et al., WO 2015/012290, Jan. 2015. (Year: 2015).*

(Continued)

*Primary Examiner* — Michael E. La Villa
(74) *Attorney, Agent, or Firm* — Wenderoth, Lind & Ponack, L.L.P.

(57) ABSTRACT

A surface-treated steel material having cut edge corrosion resistance that is equal to or more than that of a chromate treatment without use of hexavalent chromium. The surface-treated steel material includes a coating film formed on a surface of a steel material through a plating layer that is obtained by immersing the steel material in a galvalume bath containing Mg. The coating film is formed using a coating composition containing a coating film-forming resin, a cross-linking agent, a predetermined vanadium compound, and trimagnesium phosphate; the vanadium compound is a compound satisfying a predetermined electrical conductivity; the content of the vanadium compound is restricted to a predetermined amount; the vanadium compound satisfies a predetermined pH; and the content of the trimagnesium phosphate is a predetermined amount.

14 Claims, 2 Drawing Sheets

(51) Int. Cl.
- *C23C 22/42* (2006.01)
- *C23C 28/00* (2006.01)
- *C09D 5/08* (2006.01)
- *C22C 18/04* (2006.01)
- *C22C 21/10* (2006.01)
- *C23C 2/06* (2006.01)
- *C23C 28/02* (2006.01)
- *C23C 30/00* (2006.01)
- *C23C 22/60* (2006.01)
- *C23C 22/40* (2006.01)
- *C23C 2/40* (2006.01)
- *C23C 2/28* (2006.01)
- *B32B 15/01* (2006.01)
- *B32B 15/18* (2006.01)
- *B32B 15/04* (2006.01)
- *B32B 15/08* (2006.01)
- *B32B 15/092* (2006.01)
- *B32B 15/09* (2006.01)

(52) U.S. Cl.
CPC .......... *Y10T 428/12569* (2015.01); *Y10T 428/12757* (2015.01); *Y10T 428/12799* (2015.01); *Y10T 428/12972* (2015.01); *Y10T 428/12979* (2015.01); *Y10T 428/24967* (2015.01); *Y10T 428/263* (2015.01); *Y10T 428/264* (2015.01); *Y10T 428/265* (2015.01)

(56) References Cited

U.S. PATENT DOCUMENTS

| | | | |
|---|---|---|---|
| 2012/0282488 | A1 | 11/2012 | Fujii et al. |
| 2015/0107722 | A1 | 4/2015 | Nakano et al. |

FOREIGN PATENT DOCUMENTS

| | | |
|---|---|---|
| JP | 2009-227748 | 10/2009 |
| JP | 2011-184624 | 9/2011 |
| JP | 5118782 | 1/2013 |
| JP | 2013-67699 | 4/2013 |
| JP | 5341270 | 11/2013 |
| JP | 5857156 | 2/2016 |
| WO | 2011/102434 | 8/2011 |
| WO | 2012/086494 | 6/2012 |
| WO | 2013/027827 | 2/2013 |
| WO | 2015/012290 | 1/2015 |

OTHER PUBLICATIONS

International Search Report dated Apr. 18, 2017 in corresponding International Patent Application No. PCT/JP2017/009035.
Decision to Grant a Patent dated Jan. 11, 2017 in corresponding Japanese Patent Application No. 2016-088071.
Extended European Search Report dated Aug. 27, 2019 in corresponding European Patent Application No. 17789088.6.

* cited by examiner

SURFACE-TREATED STEEL MATERIAL

TECHNICAL FIELD

The present invention is a chromate-free technology of a hot-dipped steel sheet.

BACKGROUND ART

Conventionally, hot-dipped Zn—Al-based plated steel materials have been widely used in applications such as a building material, a material for automobiles, and a material for household electrical appliances. In particular, since a high aluminum (25 to 75% by mass)-zinc alloy-plated steel sheet, which is represented by 55% aluminum-zinc alloy-plated steel sheet, has superior corrosion resistance as compared with common hot-dip galvanized steel sheets, its demand continues to increase. In recent years, a building material is especially required to have further improved corrosion resistance and workability. In response to the requirement, the corrosion resistance of hot-dipped Zn—Al-based plated steel material, and the like have been improved by addition of Mg and the like to a plating layer (see, for example, Patent Literature 1).

However, in a high aluminum-zinc alloy-plated steel sheet containing Mg, wrinkles are easily formed in a surface of the plating layer, resulting in a problem of deteriorated surface appearance. Further, a sharp protrusion is formed in the surface of the plating layer due to the wrinkles. Therefore, when the plating layer is subjected to a chemical conversion treatment to form a chemical conversion treatment layer or is coated to form a coating layer, the thickness of the chemical conversion treatment layer or coating layer is easy to be uneven. Therefore, there is a problem in which improved corrosion resistance of the plated steel sheet due to coating or the like is not sufficiently exerted.

In order to solve the problems described above, Patent Literature 2 discloses a hot-dipped steel material obtained by forming an aluminum-zinc alloy plating layer on a surface of a steel material, the aluminum-zinc alloy plating layer containing Al, Zn, Si, and Mg as constituent elements thereof, wherein the aluminum-zinc alloy plating layer contains 0.1 to 10% by mass of Mg, and 0.2 to 15% by volume of an Si—Mg phase, the ratio of the mass of Mg in the Si—Mg phase to the total mass of Mg is 3% or more, and the aluminum-zinc alloy plating layer further contains 0.02 to 1.0% by mass of Cr as the constituent element thereof.

When a plated steel sheet is used for an extended period of time, rust is formed due to oxidation of a surface thereof, to deteriorate the appearance. For this reason, the surface of the plated steel sheet is usually subjected to an anticorrosive treatment. Conventionally, the anticorrosive treatment is generally a chromate treatment using a chromate that is an excellent anticorrosive. However, hexavalent chromium contained in a chromate treatment liquid may adversely affect the environment. Therefore, the use thereof has been regulated. Accordingly, various coatings containing a vanadium compound such as a metal vanadate have been proposed.

For examples, Patent Literatures 3 and 4 disclose use of anticorrosive pigment including a combination of a compound that releases phosphate ions and a compound that releases vanadate ions. However, a coating film formed using the anticorrosive pigment containing no hexavalent chromium has a problem in which corrosion resistance is not sufficient for use in outdoor applications of an outdoor device and the like.

Patent Literatures 5 and 6 disclose an anticorrosive coating composition containing, as an anticorrosive pigment, an anticorrosive pigment including (1) a vanadium compound, (2) a metal silicate, or the like, and (3) a metal phosphate. However, the anticorrosive coating composition has corrosion resistance insufficient for use in outdoor applications, similarly to the anticorrosive coatings disclosed in Patent Literatures 1 and 2, and improvement is expected.

In order to improve the corrosion resistance of the anticorrosive coating composition, an increase in content of the vanadium compound as an anticorrosive pigment is useful. However, the vanadium compound, and especially a monovalent or divalent cationic salt of vanadic acid has high water solubility. Therefore, when a large amount of the compound is contained, a coating film is likely to absorb moisture. Accordingly, the moisture resistance of the coating film is reduced, resulting in a problem of occurrence of blisters in the coating film. The blisters in the coating film also cause a reduction in corrosion resistance.

For example, Patent Literature 7 discloses a coating composition containing a coating-forming resin (a), a cross-linking agent (b), and calcium vanadate (c), wherein the electrical conductivity of 1% by mass aqueous solution of the calcium vanadate (c) is 200 to 2,000 µS/cm, and the content of the calcium vanadate (c) is 50 to 150% by mass relative to 100% by mass of the total solid content of the coating-forming resin (a) and the cross-linking agent (b), and proposes an anticorrosive coating composition that achieves both corrosion resistance and moisture resistance and does not contain hexavalent chromium.

For example, Patent Literature 8 discloses a coating composition containing a coating film-forming resin (a), a cross-linking agent (b), at least one type of vanadium compound (c) selected from the group consisting of vanadium pentoxide and an alkaline earth metal vanadate, and an anticorrosive accelerator (d), wherein the vanadium compound (c) is a compound in which the electrical conductivity of 1% by mass aqueous solution thereof at a temperature of 25° C. is 200 µS/cm to 2,000 µS/cm, the total content of the vanadium compound (c) is 5 to 150% by mass relative to 100% by mass of the total solid content of the coating film-forming resin (a) and the cross-linking agent (b), the anticorrosive accelerator (d) is at least one type of compound selected from the group consisting of a water-soluble compound (d-1) and a chelate-forming compound (d-2), the total content of the anticorrosive accelerator (d) is 1 to 150% by mass relative to 100% by mass of the total solid content of the coating film-forming resin (a) and the cross-linking agent (b), the water-soluble compound (d-1) is a compound in which the electrical conductivity of 1% by mass aqueous solution thereof at a temperature of 25° C. is more than 2,000 µS/cm and 15,000 µS/cm or less, the water-soluble compound (d-1) is at least one type of compound selected from the group consisting of an alkaline earth metal hydroxide, a vanadic acid compound, and a cerium compound, and the chelate-forming compound (d-2) is a compound having a plurality of coordination sites which are each coordinated with one metal ion. Further, Patent Literature 8 proposes the aforementioned coating composition which has excellent corrosion resistance over an extended period of time and moisture resistance and exhibits good results in a corrosion resistance test of short time.

For example, Patent Literature 9 discloses a coating composition containing (A) a hydroxy group-containing coating film-forming resin, (B) a cross-linking agent, and (C) an anticorrosive pigment mixture, wherein the anticorrosive pigment mixture (C) includes (1) at least one type of vanadium compound selected from the group consisting of vanadium pentoxide, calcium vanadate, magnesium vanadate, and ammonium metavanadate, (2) a metal phosphate that contains at least magnesium and is a salt of at least one type of acid selected from the group consisting of phosphoric acid, phosphorous acid, and tripolyphosphoric acid, and (3) a magnesium ion exchange silica, the amount of the vanadium compound (1) is 3 to 50% by mass, the amount of the metal phosphate (2) is 1 to 50% by mass, and the amount of the magnesium ion exchange silica (3) is 1 to 150% by mass, relative to the total solid content of the resin (A) and the cross-linking agent (B), and the amount of the anticorrosive pigment mixture (C) is 10 to 150% by mass.

Patent Literature 10 discloses a hot-dipped steel material obtained by forming an aluminum-zinc alloy plating layer on a surface of a steel material, the aluminum-zinc alloy plating layer containing Al, Zn, Si, and Mg as constituent elements thereof, wherein the aluminum-zinc alloy plating layer contains 0.1 to 10% by mass of Mg, and 0.2 to 15% by volume of an Si—Mg phase, the ratio of the mass of Mg in the Si—Mg phase to the total mass of Mg is 3% or more, and the aluminum-zinc alloy plating layer further contains 0.02 to 1.0% by mass of Cr as the constituent element thereof.

In recent years, a phenomenon where corrosion of coating film of a coated steel sheet is caused by "acid rain" is recognized. Herein, the "acid rain" represents a phenomenon where acid rain-causing substances derived from sulfur dioxide ($SO_2$) and nitrogen oxides ($NO_x$) dissolve in rain, snow, fog, or the like, to make the air more acidic than normal, or a phenomenon where the environment is made more acidic than normal. Between emission of the acid rain-causing substances and falling as acid rain, the acid rain-causing substances may also be transported across the border over hundreds to thousands km. Therefore, corrosion damage of the coated steel sheet is predicted to increase over a wide region. When the acid rain-causing substances are absorbed in a water film under a moisture environment where condensation occurs, the environment is made acidic, and corrosion may proceed.

In recent years, use of a pre-coated steel sheet obtained by coating a plated steel sheet in advance increases, and a problem of cut edge corrosion in which corrosion is caused from an edge formed during cutting (i.e., cut edge corrosion resistance) is made serious.

CITATION LIST

Patent Literature

Patent Literature 1: JPH11-279735
Patent Literature 2: JP5118782
Patent Literature 3: JPH05-50444
Patent Literature 4: JP3461741
Patent Literature 5: JP4323530
Patent Literature 6: JP2009-227748
Patent Literature 7: JP2011-184624
Patent Literature 8: JP2013-067699
Patent Literature 9: WO2012/086494
Patent Literature 10: JP5857156

SUMMARY OF INVENTION

Technical Problem

In development of conventional chromate-free technology, the corrosion resistance of the chromate-free technology is tried to be made close to the corrosion resistance of a chromate treatment. However, the same corrosion resistance as that of the chromate treatment is not obtained. In particular, the cut edge corrosion resistance described above is remarkably lower than that of the chromate treatment. For this reason, improvement is required.

An object of the present invention is to provide a surface-treated steel material having cut edge corrosion resistance that is equal to or more than that of the chromate treatment without use of hexavalent chromium.

Solution to Problem

In order to solve the above-described problems, a surface-treated steel material according to the present invention includes a coating film formed on a surface of a steel material through a base layer containing at least an aluminum-zinc alloy plating layer, the aluminum-zinc alloy plating layer containing Al, Zn, Si, Cr, and Mg as constituent elements thereof, wherein the aluminum-zinc alloy plating layer contains 0.1 to 10% by mass of Mg, 0.02 to 1.0% by mass of Cr, and 0.2 to 15% by volume of an Si—Mg phase, a ratio of a mass of Mg in the Si—Mg phase to a total mass of Mg is 3% or more, the coating film contains a coating film-forming resin (a), a cross-linking agent (b), at least one type of vanadium compound (c) selected from the group consisting of an alkaline earth metal vanadate and magnesium vanadate, and trimagnesium phosphate (d), the vanadium compound (c) is a compound in which an electrical conductivity of 1% by mass aqueous solution thereof at a temperature of 25° C. is 200 µS/cm to 2,000 µS/cm, a content of the vanadium compound (c) is more than 50% by mass and 150% by mass or less relative to 100% by mass of a total of the coating film-forming resin (a) and the cross-linking agent (b), a pH of 1% by mass aqueous solution of the vanadium compound (c) is 6.5 to 11, and a content of the trimagnesium phosphate (d) is 3 to 150% by mass relative to 100% by mass of the total of the coating film-forming resin (a) and the cross-linking agent (b).

Advantageous Effects of Invention

The present invention can provide a surface-treated steel material having cut edge corrosion resistance that is equal to or more than that of a chromate treatment without use of hexavalent chromium.

DESCRIPTION OF EMBODIMENTS

Figure 1:
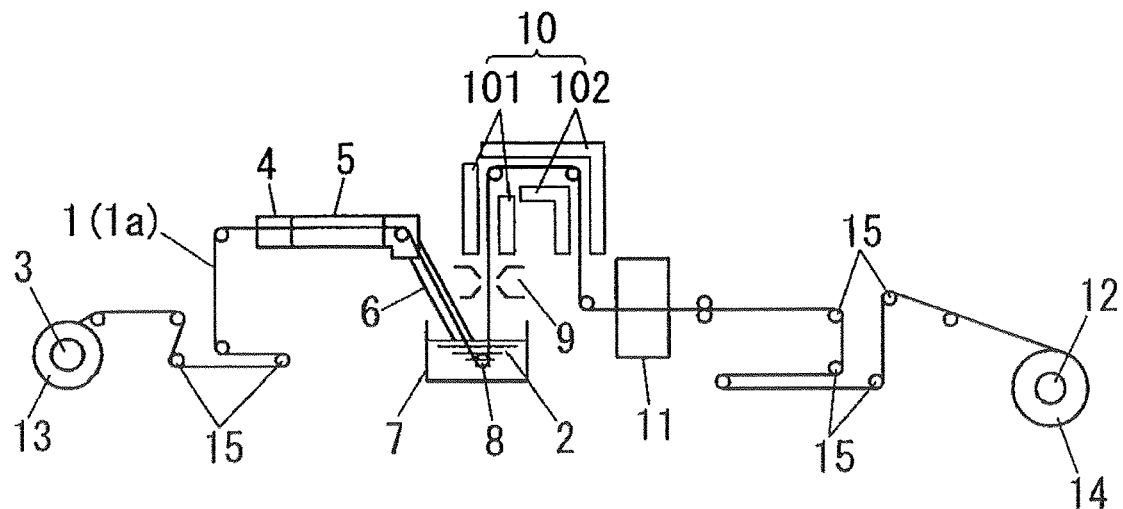
FIG. 1 is a schematic view illustrating an example of a hot-dipping apparatus.

In a surface-treated steel material of this embodiment, a base layer containing at least an aluminum-zinc alloy plating layer (hereinafter simply referred to as "plating layer") is formed on a surface of a steel material, and a coating film is formed from a coating composition as an upper layer. Examples of the steel material may include various members such as a thin steel sheet, a thick steel sheet, a die steel, a steel pipe, and a steel wire. Therefore, the shape of the steel material is not particularly limited. In this embodiment, the base layer includes the plating layer and a chemical conversion treatment layer that is formed on the plating layer by a chromate-free chemical conversion treatment. The content of this chemical conversion treatment layer is not particularly limited.

The plating layer is formed by a hot-dipping treatment, and contains Al, Zn, Si, Cr, and Mg as constituent elements thereof. When the whole amount of the plating layer is taken as 100% by mass, the content of Mg is 0.1 to 10% by mass. Therefore, the corrosion resistance of surface of the plating layer is especially improved by Al. Additionally, edge creep is suppressed especially on a cut edge surface of the surface-treated steel material due to a sacrificial corrosion prevention action by Zn, to improve the corrosion resistance of the surface-treated steel material. Further, excessive alloying between the Al and the steel material in the plating layer is suppressed by Si. As a result, in an alloy layer (described below) interposed between the plating layer and the steel material, degradation of workability of the surface-treated steel material is suppressed. Moreover, the plating layer appropriately contains Mg, which is a less noble metal than Zn. Therefore, the sacrificial corrosion prevention action of the plating layer is enhanced, and the corrosion resistance of the surface-treated steel material is further improved.

When the whole amount of the plating layer is taken as 100% by volume, the plating layer contains 0.2 to 15% by volume of Si—Mg phase. The Si—Mg phase, which is a phase formed of an intermetallic compound of Si and Mg, is dispersed in the plating layer. As the volume ratio of the Si—Mg phase in the plating layer is higher, wrinkling in the plating layer is suppressed. This is considered to be because the Si—Mg phase is deposited in a molten plating metal before the molten plating metal is completely solidified and this Si—Mg phase suppresses flow of the molten plating metal in a process in which the plating layer is formed by solidifying the molten plating metal with cooling during production of the surface-treated steel material.

When the whole amount of the plating layer is taken as 100% by volume, the volume ratio of the Si—Mg phase is 0.2 to 15% by volume, preferably 0.2 to 10% by volume, and more preferably 0.4 to 5% by volume.

The volume ratio of the Si—Mg phase in the plating layer is equal to the area ratio of the Si—Mg phase in a cross section in which the plating layer is cut in the thickness direction thereof. The Si—Mg phase in the cross section of the plating layer can be clearly confirmed by observation by an electron microscope. Therefore, the volume ratio of the Si—Mg phase in the plating layer can be measured indirectly by measuring the area ratio of the Si—Mg phase in the cross section.

The plating layer includes the Si—Mg phase and another phase containing Zn and Al. The phase containing Zn and Al is mainly composed of an α-Al phase (dendritic structure) and a Zn—Al—Mg eutectic phase (interdendritic structure). The phase containing Zn and Al can further contain various types of phases such as a phase composed of Mg—$Zn_2$ (Mg—$Zn_2$ phase), a phase composed of Si (Si phase), and a phase composed of an Fe—Al intermetallic compound (Fe—Al phase) according to a composition of the plating layer. Therefore, the volume ratio of the phase containing Zn and Al in the plating layer is 99.8 to 85% by volume, preferably 99.8 to 90% by volume, and more preferably 99.6 to 95% by volume.

The ratio of the mass of Mg in the Si—Mg phase to the total mass of Mg in the plating layer is 3% by mass or more. Mg which is not contained in the Si—Mg phase is contained in the phase containing Zn and Al. In the phase containing Zn and Al, Mg is contained in the α-Al phase, the Zn—Al—Mg eutectic phase, the Mg—$Zn_2$ phase, an Mg-containing oxide film that is formed on a plating surface, and the like. When Mg is contained in the α-Al phase, the Mg is in solid solution in the α-Al phase.

The ratio of the mass of Mg in the Si—Mg phase to the total mass of Mg in the plating layer can be calculated by considering the Si—Mg phase to have a stoichiometric composition of $Mg_2Si$. Further, the Si—Mg phase may actually contain small amounts of elements other than Si and Mg, such as Al, Zn, Cr and Fe, and a composition ratio of Si and Mg in the Si—Mg phase may slightly vary from the stoichiometric composition. However, in consideration of these, it is extremely difficult to exactly determine the amount of Mg in the Si—Mg phase. Accordingly, in the present invention, when the ratio of the mass of Mg in the Si—Mg phase to the total mass of Mg in the plating layer is determined, the Si—Mg phase is considered to have the stoichiometric composition of $Mg_2Si$ as described above.

The ratio of the mass of Mg in the Si—Mg phase to the total mass of Mg in the plating layer can be calculated by the following equation (1).

$$R = A/(M \times CMG/100) \times 100 \tag{1}$$

R is the ratio (% by mass) of the mass of Mg in the Si—Mg phase to the total mass of Mg in the plating layer. A is the content (g/m$^2$) of Mg contained in the Si—Mg phase in the plating layer per unit area of the plating layer as viewed in a plan view. M is the mass (g/m$^2$) of the plating layer per unit area of the plating layer as viewed in a plan view. CMG is the content (% by mass) of all Mg in the plating layer.

A can be calculated by the following equation (2).

$$A = V_2 \times \rho_2 \times \alpha \tag{2}$$

$V_2$ is the volume (m$^3$/m$^2$) of the Si—Mg phase in the plating layer per unit area of the plating layer as viewed in a plant view. $\rho_2$ is the density of the Si—Mg phase, and the value thereof is $1.94 \times 10^6$ (g/m$^3$). α is the mass ratio of Mg contained in the Si—Mg phase, and the value thereof is 0.63.

$V_2$ can be calculated by the following equation (3).

$$V_2 = V_1 \times R_2/100 \tag{3}$$

$V_1$ is the total volume (m$^3$/m$^2$) of the plating layer per unit area of the plating layer as viewed in a plan view. $R_2$ is the volume ratio (% by volume) of the Si—Mg phase in the plating layer.

$V_1$ can be calculated by the following equation (4).

$$V_1 = M/\rho_1 \tag{4}$$

$\rho_1$ is the density (g/m$^3$) of the whole plating layer. The value of $\rho_1$ can be calculated by weighted averaging the densities of the constituent elements in the plating layer at normal temperature on the basis of the composition of the plating layer.

In this embodiment, Mg in the plating layer is contained in the Si—Mg phase at a high ratio as described above. Therefore, the amount of Mg present in a surface layer of the plating layer is decreased. Thus, formation of an Mg-based oxide film in the surface layer of the plating layer is suppressed. Accordingly, wrinkling in the plating layer caused by the Mg-based oxide film is reduced. When the ratio of the mass of Mg in the Si—Mg phase to the total amount of Mg is higher, wrinkling is suppressed. This ratio is more preferably 5% by mass or more, further preferably 20% by mass or more, and particularly preferably 50% by mass or more. The upper limit of the ratio of the mass of Mg in the Si—Mg phase to the total amount of Mg is not particularly limited, and this ratio may be 100% by mass.

It is preferable that the Mg content at any region having a size of 4 mm in diameter and 50 nm in depth in the outermost layer having a depth of 50 nm in the plating layer be less than 60% by mass. The Mg content in this outermost layer of the plating layer can be measured by glow discharge-optical emission spectroscopy (GD-OES). When it is difficult to obtain accurate values for quantitative analysis of concentration, the absence of an oxide film of MgO alone in the outermost layer of the plating layer may be confirmed by comparing concentration curves of the plurality of elements contained in the plating layer.

As the Mg content in the outermost layer of the plating layer is smaller, wrinkling caused by an Mg-based oxide film is reduced. This Mg content is more preferably less than 40% by mass, further preferably less than 20% by mass, and particularly preferably less than 10% by mass. In the outermost layer, having a thickness of 50 nm, of the plating layer, it is preferable that a portion where the Mg content is 60% by mass or more be not present, it is more preferable that a portion where the Mg content is 40% by mass or more be not present, and it is further preferable that a portion where the Mg content is 20% by mass or more be not present.

The physical significance of the Mg content will be described. The Mg content in an MgO oxide having a stoichiometric composition is about 60% by mass. Specifically, an Mg content of less than 60% by mass means that MgO having a stoichiometric composition (oxide film of MgO alone) is not present in the outermost layer of the plating layer, or the formation of MgO having such a stoichiometric composition is extremely suppressed. In the embodiment, when excessive oxidation of Mg in the outermost layer of the plating layer is suppressed, the formation of the oxide film of MgO alone is suppressed. In the outermost layer of the plating layer, complex oxides containing small or large amounts of oxides of elements other than Mg, such as Al, Zn, and Sr, are formed. Therefore, the Mg content in the surface layer of the plating layer is considered to be relatively decreased.

The area ratio of the Si—Mg phase on the surface of the plating layer is preferably 30% or less. When the Si—Mg phase is present in the plating layer, the Si—Mg phase tends to be formed in a thin mesh form on the surface of the plating layer. When the area ratio of the Si—Mg phase is large, the appearance of the plating layer is changed. When the plating surface distribution of the Si—Mg phase is uneven, uneven in gloss is visually observed in the appearance of the plating layer. This uneven in gloss is an appearance defect referred to as running. When the area ratio of the Si—Mg phase on the surface of the plating layer is 30% or less, running is suppressed and the appearance of the plating layer is improved. Further, a low area ratio of the Si—Mg phase on the surface of the plating layer is also effective in maintaining the corrosion resistance of the plating layer over a long period of time. When deposition of the Si—Mg phase on the surface of the plating layer is suppressed, the amount of the Si—Mg phase to be deposited inside the plating layer is relatively increased. Therefore, the amount of Mg inside the plating layer is increased. Thus, the sacrificial corrosion prevention action of Mg is exerted in the plating layer over a long period of time, and as a result, high corrosion resistance of the plating layer is maintained over a long period of time. In order to improve the appearance of the plating layer and maintain the corrosion resistance of the plating layer, the area ratio of the Si—Mg phase on the surface of the plating layer is more preferably 20% or less, further preferably 10% or less, and particularly preferably 5% or less.

The Mg content in the plating layer falls within a range of 0.1 to 10% by mass as described above. When the Mg content is less than 0.1% by mass, the corrosion resistance of the plating layer may not be sufficiently ensured. When the Mg content is more than 10% by mass, the corrosion resistance is reduced, and dross is likely to be formed in a hot-dipping bath during production of the plated steel material. This Mg content is more preferably 0.5% by mass or more, and further preferably 1.0% by mass or more. In addition, this Mg content is particularly preferably 5.0% by mass or less, and more preferably 3.0% by mass or less. The Mg content particularly preferably falls within a range of 1.0 to 3.0% by mass.

It is preferable that the Al content in the plating layer fall within a range of 25 to 75% by mass. When the Al content is 25% by mass or more, the Zn content in the plating layer is not excessive, and the corrosion resistance on the surface of the plating layer is sufficiently ensured. When the Al content is 75% by mass or less, the sacrificial corrosion prevention effect by Zn is sufficiently exerted, and in addition, hardening of the plating layer is suppressed, to enhance the bending workability of the surface-treated steel material. Further, the Al content is also preferably 75% by mass or less since wrinkling in the plating layer is suppressed by preventing fluidity of the molten plating metal from excessively decreasing during production of the plated steel material. This Al content is particularly preferably 45% by mass or more. The Al content is particularly preferably 65% by mass or less. The Al content particularly preferably falls within a range of 45 to 65% by mass.

The Si content in the plating layer preferably falls within a range of 0.5 to 10% by mass relative to the Al content. When the Si content is 0.5% by mass or more relative to the Al content, excessively alloying between the Al in the plating layer and the steel material is sufficiently suppressed. When the Si content is more than 10% by mass, the action of Si is saturated, and dross tends to be formed in the hot-dipping bath during production of the plated steel material. This Si content is particularly preferably 1.0% by mass or more. Furthermore, the Si content is particularly preferably 5.0% by mass or less. The Si content particularly preferably falls within a range of 1.0 to 5.0% by mass.

Further, the mass ratio of Si to Mg in the plating layer preferably falls within a range of 100:50 to 100:300. In this case, the formation of the Si—Mg phase in the plating layer is especially promoted and wrinkling in the plating layer is further suppressed. This mass ratio of Si to Mg is more preferably 100:70 to 100:250, and further preferably 100:100 to 100:200.

The plating layer contains Cr as the constituent element thereof, as described above. In this case, growth of the Si—Mg phase in the plating layer is promoted by Cr, the volume ratio of the Si—Mg phase in the plating layer is increased, and the ratio of the mass of Mg in the Si—Mg phase to the total mass of Mg in the plating layer is increased. This further suppresses wrinkling in the plating layer. The Cr content in the plating layer preferably falls within a range of 0.02 to 1.0% by mass. When the Cr content in the plating layer is less than 0.02% by mass, it is difficult to sufficiently ensure the corrosion resistance of the plating layer, and it is difficult to sufficiently suppress wrinkling and running in the plating layer. When the Cr content in the plating layer is more than 1.0% by mass, not only is the aforementioned action saturated, but also dross tends to be formed in the hot-dipping bath during production of the plated steel material. As a result, the coating film smoothness after coating is reduced. This Cr content is preferably 0.05% by mass or more. The Cr content is further preferably 0.5% by mass or less. The Cr content particularly preferably falls within a range of 0.07 to 0.2% by mass.

The Cr content in the outermost layer having a depth of 50 nm in the plating layer is preferably 100 to 500 ppm by mass. In this case, the corrosion resistance of the plating layer is further improved. This is considered to be because when Cr is present in the outermost layer, a passivation film is formed on the plating layer to suppress anodic dissolution of the plating layer. This Cr content is more preferably 150 to 450 ppm by mass, and further preferably 200 to 400 ppm by mass.

It is preferable that an alloy layer containing Al and Cr be interposed between the plating layer and the steel material. In the present invention, the alloy layer is considered to be a layer different from the plating layer. The alloy layer may contain various metal elements such as Mn, Fe, Co, Ni, Cu, Zn, or Sn as constituent elements thereof, in addition to Al and Cr. When such an alloy layer is present, the growth of the Si—Mg phase in the plating layer is promoted by Cr in the alloy layer, the volume ratio of the Si—Mg phase in the plating layer is increased, and the ratio of the mass of Mg in the Si—Mg phase to the total mass of Mg in the plating layer is increased. As a result, wrinkling and running in the plating layer are further suppressed. In particular, the ratio of the content ratio (mass ratio) of Cr in the alloy layer to the content ratio (mass ratio) of Cr in the plating layer preferably falls within a range of 2 to 50. In this case, the growth of the Si—Mg phase is promoted near the alloy layer in the plating layer, and the area ratio of the Si—Mg phase on the surface of the plating layer is decreased. Therefore, running is further suppressed and the corrosion resistance of the plating layer is further maintained over a longer period of time. The ratio of the content ratio of Cr in the alloy layer to the content ratio of Cr in the plating layer is preferably 3 to 40, and further preferably 4 to 25. The amount of Cr in the alloy layer can be determined by measuring the cross section of the plating layer using an energy-dispersive X-ray spectrometer (EDS).

The thickness of the alloy layer preferably falls within a range of 0.05 to 5 µm. When this thickness is 0.05 µm or more, the aforementioned action of the alloy layer is effectively exerted. When the thickness is 5 µm or less, workability of the surface-treated steel material is unlikely to be impaired by the alloy layer.

When the plating layer contains Cr, corrosion resistance is also improved after bending and deformation of the plating layer. The reason for this is considered as follows. When the plating layer is severely bent and deformed, the plating layer and a coating film on the plating layer may be cracked. At that time, water and oxygen may be penetrated into the plating layer through the cracks, to directly expose the alloy in the plating layer to corrosion factors. However, Cr present especially in the surface layer of the plating layer and Cr present in the alloy layer suppress a corrosion reaction of the plating layer, to suppress expansion of corrosion starting from the cracks. In order to especially improve the corrosion resistance after bending and deformation of the plating layer, the Cr content in the outermost layer having a depth of 50 nm in the plating layer is preferably 300 ppm by mass or more, and particularly preferably within a range of 200 to 400 ppm by mass. In order to especially improve the corrosion resistance after bending and deformation of the plating layer, the ratio of the content ratio (mass ratio) of Cr in the alloy layer to the content ratio (mass ratio) of Cr in the plating layer is preferably 20 or more, and particularly preferably within a range of 20 to 30.

It is preferable that the plating layer further contain Sr as the constituent element thereof. In this case, the formation of the Si—Mg phase in the plating layer is especially promoted by Sr. Further, the formation of the Mg-based oxide film in the surface layer of the plating layer is suppressed by Sr. This is considered to be because the formation of the Mg-based oxide film is inhibited since an oxide film of Sr is preferentially formed more easily than the Mg-based oxide film. Therefore, wrinkling in the plating layer is further suppressed. The Sr content in the plating layer preferably falls within a range of 1 to 1,000 ppm by mass. When this Sr content is less than 1 ppm by mass, the aforementioned action is not exerted. When the Sr content is more than 1,000 ppm by mass, not only is the action of Sr saturated, but also dross tends to be formed in the hot-dipping bath during production of the plated steel sheet. This Sr content is particularly preferably 5 ppm by mass or more. Further, the Sr content is particularly preferably 500 ppm by mass or less, and further preferably 300 ppm by mass or less. The Sr content more preferably falls within a range of 20 to 50 ppm by mass.

It is preferable that the plating layer further contain Fe as the constituent element thereof. In this case, the formation of the Si—Mg phase in the plating layer is further promoted by Fe. Further, Fe also contributes to fining of microstructure and spangle structure of the plating layer. Thus, the appearance and workability of the plating layer are improved. The Fe content in the plating layer preferably falls within a range of 0.1 to 1.0% by mass. When this Fe content is less than 0.1% by mass, the microstructure and spangle structure of the plating layer become coarse, to deteriorate the appearance of the plating layer and deteriorate the workability. When the Fe content is more than 1.0% by mass, the spangle of the plating layer is excessively fine or disappears. As a result, improvement in appearance due to the spangle is not achieved, and dross tends to be formed in the hot-dipping bath during production of the surface-treated steel material. The appearance of the plating layer is further deteriorated. This Fe content is particularly preferably 0.2% by mass or more. Further, the Fe content is particularly preferably 0.5% by mass or less. The Fe content particularly preferably falls within a range of 0.2 to 0.5% by mass.

The plating layer may further contain elements selected from alkaline earth elements, Sc, Y, lanthanoid elements, Ti, and B as the constituent elements thereof.

The alkaline earth elements (Be, Ca, Ba, and Ra), Sc, Y, and lanthanoid elements (La, Ce, Pr, Nd, Pm, Sm, Eu, etc.) exert an action similar to that of Sr. The total content of these components in the plating layer is preferably 1.0% by mass or less as a mass ratio.

When the plating layer contains at least one of Ti and B, the α-Al phase (dendritic structure) of the plating layer is made finer to make a spangle finer. For this reason, the appearance of the plating layer is improved by the spangle. Further, wrinkling in the plating layer is suppressed by at least one of Ti and B. This is considered to be because the Si—Mg phase is also made finer due to the action of Ti and B, and this fine Si—Mg phase effectively suppresses flow of molten plating metal in a process in which the molten plating metal is solidified to form the plating layer. Moreover, the concentration of stress in the plating layer during bending is relaxed by making such a plating structure finer, occurrence of large cracks is suppressed, and the bending workability of the plating layer is further improved. In order to exert the aforementioned actions, the total content of Ti and/or B in a hot-dipping bath 2 preferably falls within a range of 0.0005 to 0.1% by mass as a mass ratio. The total content of Ti and/or B is particularly preferably 0.001% by mass or more. The total content of Ti and/or B is particularly preferably 0.05% by mass or less. The total content of Ti and/or B particularly preferably falls within a range of 0.001 to 0.05% by mass.

Zn accounts for a remainder of the whole constituent elements of the plating layer except for the constituent elements other than Zn.

It is preferable that the plating layer do not contain elements other than the aforementioned elements as the constituent elements thereof. In particular, it is preferable that the plating layer contain only Al, Zn, Si, Mg, Cr, Sr, and Fe as the constituent elements, or contain only these elements and elements selected from the alkaline earth elements, Sc, Y, lanthanoid elements, Ti, and B, as the constituent elements thereof.

However, the plating layer may also contain unavoidable impurities such as Pb, Cd, Cu, and Mn although it goes without saying. It is preferable that the content of the unavoidable impurities be as low as possible. It is particularly preferable that the total content of the unavoidable impurities be 1% by mass or less as a mass ratio relative to the plating layer.

[Method for Producing Plating Layer]

In a preferred embodiment, a steel material is immersed in a hot-dipping bath having a composition corresponding to the composition of the constituent elements of the plating layer. The alloy layer is formed between the steel material and the plating layer by a hot-dipping treatment, but the resulting change in composition is small enough to be ignored.

In the embodiment, the hot-dipping bath that contains, for example, 25 to 75% by mass of Al, 0.5 to 10% by mass of Mg, 0.02 to 1.0% by mass of Cr, 0.5 to 10% by mass of Si relative to Al, 1 to 1,000 ppm by mass of Sr, 0.1 to 1.0% by mass of Fe, and Zn is prepared. The mass ratio of Si to Mg in the hot-dipping bath preferably falls within a range of 100:50 to 100:300.

In another embodiment, for example, a hot-dipping bath that contains 25 to 75% by mass of Al, 0.02 to 1.0% by mass of Cr, 0.5 to 10% by mass of Si relative to Al, 0.1 to 0.5% by mass of Mg, 0.1 to 0.6% by mass of Fe, and 1 to 500 ppm by mass of Sr, or components selected from the alkaline earth elements, lanthanoid elements, Ti, and B, and Zn as the remainder can be prepared.

In the plating layer formed by the hot-dipping treatment, wrinkles are unlikely to be formed. Conventionally, when a molten metal (molten plating metal) containing Mg is adhered to the steel material by the hot-dipping treatment, Mg is likely to be concentrated on the surface of the molten plating metal. As a result, the Mg-based oxide film is formed, and wrinkles are likely to be formed in the plating layer due to this Mg-based oxide film. However, when the plating layer is formed using the hot-dipping bath having the aforementioned composition, concentration of Mg in the surface layer of the molten plating metal adhered to the steel material is suppressed, and wrinkles are unlikely to be formed on the surface of the plating layer even if flow of the molten plating metal occurs. Further, fluidity inside the molten plating metal is reduced, and flow of the molten plating metal is suppressed. Therefore, the wrinkles are further unlikely to be formed.

Suppression of concentration of Mg and flow of the molten plating metal as described above is considered to be achieved by the following mechanism.

In a process of solidifying the molten plating metal adhered to the surface of the steel material with cooling, the α-Al phase is first deposited as primary crystals, growing into a dendritic structure. When solidification of the α-Al phase which is rich in Al progresses, the Mg and Si concentrations in the remaining molten plating metal (i.e., in a component that is not solidified in the molten plating metal) are gradually increased. Next, when the steel material is cooled and the temperature thereof is further decreased, an Si-containing phase containing Si (Si—Mg phase) is solidified and deposited from the inside of the remaining molten plating metal. This Si—Mg phase is a phase composed of an alloy of Mg and Si as described above. The deposition and growth of this Si—Mg phase are promoted by Cr, Fe, and Sr. Mg in the molten plating metal is incorporated into this Si—Mg phase. As a result, migration of Mg to the surface layer of the molten plating metal is inhibited, and concentration of Mg in the surface layer of the molten plating metal is suppressed.

Further, Sr in the molten plating metal also contributes to suppression of concentration of Mg. This is considered to be because Sr in the molten plating metal is an element that is easily oxidized similarly to Mg. Specifically, Sr competitively forms an oxide film on the plating surface with Mg, and as a result, formation of the Mg-based oxide film is suppressed.

Moreover, when the Si—Mg phase is solidified and grown in the remaining molten plating metal other than the α-Al phase as primary crystals as described above, the molten plating metal is in a solid-liquid mixed phase state. Thus, the fluidity of the molten plating metal itself is reduced, and as a result, wrinkling in the surface of the plating layer is suppressed.

Fe is important in terms of controlling the microstructure and spangle of the plating layer. Although a reason in which Fe affects the structure of the plating layer is not necessarily clear at present, this is considered to be because Fe alloys with Si in the molten plating metal, and this alloy acts as a solidification nucleus during solidification of the molten plating metal.

Since Sr is a less noble element similarly to Mg, the sacrificial corrosion prevention action of the plating layer is further enhanced by Sr, and the corrosion resistance of the surface-treated steel material is further improved. Sr also exerts an action of suppressing deposition of the Si phase and the Si—Mg phase in a needle shape. Therefore, the Si phase and Si—Mg phase are formed in a spherical shape, and the formation of cracks in the plating layer is suppressed.

An alloy layer containing a part of Al in the molten plating metal is also formed between the plating layer and the steel material during the hot-dipping treatment. For example, when the steel material is not pre-plated, an Fe—Al-based alloy layer mainly containing Al in the plating bath and Fe in the steel material is formed. When the steel material is pre-plated, an alloy layer that contains Al in the plating bath and a portion or all of the constituent elements of pre-plating, or further contains Fe in the steel material is formed.

When the plating bath contains Cr, the alloy layer further contains Cr in addition to Al as constituent elements. The alloy layer can contain various metal elements such as Si, Mn, Fe, Co, Ni, Cu, Zn, and Sn in addition to Al and Cr as constituent elements thereof according to the composition of the plating bath, the presence or absence of pre-plating, the composition of a steel material 1, or the like.

A portion of Cr in the molten plating metal is contained in the alloy layer at a higher concentration than that in the plating layer. When such an alloy layer is formed, growth of the Si—Mg phase in the plating layer is promoted by Cr in the alloy layer. Thus, the volume ratio of the Si—Mg phase in the plating layer is increased, and the ratio of the mass of Mg in the Si—Mg phase to the total mass of Mg in the plating layer is increased. The effect is described above, and therefore, the description thereof is not repeated here.

When the thickness of the alloy layer is too large, workability of the surface-treated steel material is reduced. However, excessive growth of the alloy layer is suppressed by the action of Si in the hot-dipping bath. Therefore, favorable workability of the surface-treated steel material is ensured. The thickness of the alloy layer preferably falls within a range of 0.05 to 5 μm. When the thickness of the alloy layer falls within this range, the corrosion resistance of the surface-treated steel material is sufficiently improved and the workability is also sufficiently improved.

Further, the Cr concentration near the surface of the plating layer is maintained within a certain range in the plating layer. Therefore, the corrosion resistance of the plating layer is further improved. Although the reason for this is not clear, this is presumed to be because a complex oxide film is formed near the surface of the plating layer due to bonding of Cr and oxygen. In order to improve the corrosion resistance of the plating layer, the Cr content in the outermost layer having a depth of 50 nm in the plating layer is preferably 100 to 500 ppm by mass.

When the hot-dipping bath contains Cr, the corrosion resistance of the plating layer after bending and deformation is also improved. The reason for this is considered as follows. When the plating layer is subjected to severe bending and deformation, the plating layer and the coating film on the plating layer may be cracked. At that time, water and oxygen may be penetrated into the plating layer through the cracks, to directly expose the alloy in the plating layer to corrosion factors. However, Cr present especially in the surface layer of the plating layer and Cr present in the alloy layer suppress a corrosion reaction of the plating layer, and as a result, expansion of corrosion starting from the cracks is suppressed.

The molten plating metal used in the preferred embodiment described above is a multi-component molten metal containing seven or more component elements. Although a solidification process thereof is extremely complex and theoretical prediction of the process is difficult, the present inventors have obtained the important findings described above through observations and the like in experiments.

When the composition of the hot-dipping bath is adjusted as described above, wrinkling and running in the plating layer can be suppressed as described above, and the corrosion resistance and workability of the surface-treated steel material may be ensured.

When the hot-dipping bath especially contains Ca, the formation of dross in the hot-dipping bath is significantly suppressed. When the hot-dipping bath contains Mg, it is difficult to prevent formation of dross to some degree even at an Mg content of 10% by mass or less. In order to ensure favorable appearance of the surface-treated steel material, it is necessary to remove the dross from the plating bath. However, when the hot-dipping bath further contains Ca, formation of dross caused by Mg is significantly suppressed. For this reason, deterioration of appearance of the surface-treated steel material by the dross is further suppressed, and additionally, a trouble taken to remove the dross from the hot-dipping bath is reduced. The Ca content in the hot-dipping bath preferably falls within a range of 100 to 5,000 ppm by mass. When the Ca content is 100 ppm by mass or more, the formation of dross in the hot-dipping bath is effectively suppressed. When the Ca content is excessive, dross caused by Ca may be formed. However, when the Ca content is 5,000 ppm by mass or less, dross caused by Ca is suppressed. The Ca content preferably falls within a range of 200 to 1,000 ppm by mass.

It is preferable that there be no protrusion having a height of higher than 200 μm and a steepness of higher than 1.0 especially on the surface of the plating layer by reducing wrinkles in the surface of the plating layer as described above. The steepness is a value defined by (height of protrusion (μm))/(width of bottom of protrusion (μm)). The bottom of a protrusion represents a portion where the protrusion intersects a virtual plane containing a flat surface surrounding the protrusion. The height of a protrusion represents the height from the bottom of the protrusion to the tip of the protrusion. When the steepness is low, the appearance of the plating layer is further improved. Further, when the coating film is formed on the plating layer so as to be laminated as described below, the coating film is prevented from being penetrated by the protrusion, and additionally, the thickness of the coating film can be easily made uniform. Therefore, the appearance of the surface-treated steel material having the coating film is improved, and the surface-treated steel material may further exert excellent corrosion resistance or the like due to the coating film.

The degree of concentration of Mg, the state of the Si—Mg phase, the thickness of the alloy layer, and the steepness of protrusion on the surface of the plating layer may be adjusted by the hot-dipping treatment of the steel material using the hot-dipping bath having the aforementioned composition.

In the hot-dipping treatment, a steel material in which a pre-plating layer containing at least one component selected from Cr, Mn, Fe, Co, Ni, Cu, Zn, and Sn is formed may be subjected to a hot-dipping treatment for forming the plating layer. When the steel material is pre-plated before the hot-dipping treatment, the pre-plating layer is formed on the surface of the steel material. Due to this pre-plating layer, wettability between the steel material and molten plating metal during the hot-dipping treatment is improved, and adhesion between the steel material and the plating layer is improved.

The pre-plating layer depends on the type of metal constituting the pre-plating layer. However, the pre-plating layer also contributes to further improvement of surface appearance and corrosion resistance of the plating layer. For example, when a pre-plating layer containing Cr is formed, formation of an alloy layer containing Cr between the steel material and the plating layer is promoted, and the corrosion resistance of the surface-treated steel material is further improved. For example, when a pre-plating layer containing Fe and Ni is formed, wettability between the steel material and the molten plating metal is improved, and adhesion of the plating layer is highly improved. In addition, deposition of the Si—Mg phase is further promoted, and the surface appearance of the plating layer is further improved. It is considered that the deposition of the Si—Mg phase is promoted due to a reaction of the pre-plating layer and the molten plating metal.

The amount of the pre-plating layer to be attached is not particularly limited, and the amount of the pre-plating layer to be attached to one surface of the steel material preferably falls within a range of 0.1 to 3 g/m$^2$. When this amount is less than 0.1 g/m$^2$, it is difficult to cover the surface of the steel material with the pre-plating layer, and the improvement effect due to pre-plating is not sufficiently exerted. When the amount is more than 3 g/m$^2$, the improvement effect is saturated, and production cost is high.

Hereinafter, a summary of a hot-dipping apparatus for subjecting the steel material to a hot-dipping treatment and a suitable treatment condition for the hot-dipping treatment will be described with reference to FIG. 1 and the like. FIG. 1 is a schematic view illustrating an example of a hot-dipping apparatus.

A steel material 1 targeted for treatment is a member formed from steel such as carbon steel, alloy steel, stainless steel, nickel chromium steel, nickel chromium molybdenum steel, chromium steel, chromium molybdenum steel, and manganese steel. Examples of the steel material 1 may include various members such as a thin steel sheet, a thick steel sheet, a die steel, a steel pipe, and a steel wire. Therefore, the shape of the steel material 1 is not particularly limited.

The steel material 1 may be subjected to a flux treatment before a hot-dipping treatment. By this flux treatment, wettability and adhesion between the steel material 1 and a hot-dipping bath 2 may be improved. The steel material 1 may be subjected to thermal annealing and reduction treatments before immersion in the hot-dipping bath 2, or the treatments may be omitted. The steel material 1 may also be subjected to a pre-plating treatment before the hot-dipping treatment, as described above.

Hereinafter, a step of producing a hot-dipped steel sheet when a plate material (steel sheet 1a) is used as the steel material 1, that is, when the hot-dipped steel sheet is produced will be described.

The hot-dipping apparatus shown in FIG. 1 is provided with a conveying device that continuously conveys the steel sheet 1a. This conveying device includes a feeder 3, a winder 12, and a plurality of conveying rollers 15. In this conveying device, a coil 13 of the elongated steel sheet 1a (first coil 13) is held by the feeder 3. This first coil 13 is unwound by the feeder 3, and the steel sheet 1a is conveyed to the winder 12 while the steel sheet 1a is supported by the conveying rollers 15. Further, the steel sheet 1a is wound by the winder 12. A coil 12 (second coil 12) of the steel sheet 1a is held by this winder 12.

In this hot-dipping apparatus, a heating furnace 4, an annealing-cooling unit 5, a snout 6, a pot 7, a spray nozzle 9, a cooling device 10, and a temper rolling-shape correcting device 11 are provided sequentially from the upstream side of a route of conveying the steel sheet 1a by the conveying device. The heating furnace 4 heats the steel sheet 1a. This heating furnace 4 includes an oxidation-free furnace or the like. The annealing-cooling unit 5 heats and anneals the steel sheet 1a, followed by cooling. This annealing-cooling unit 5, which is connected to the heating furnace 4, is provided with an annealing furnace on the upstream side, and a cooling zone (cooler) on the downstream side. The inside of the annealing-cooling unit 5 is held under a reducing atmosphere. The snout 6 is a tubular member through which the steel sheet 1a is conveyed. One end of the snout 6 is connected to the annealing-cooling unit 5, and another end thereof is disposed in the hot-dipping bath 2 in the pot 7. The inside of the snout 6 is held under a reducing atmosphere similarly to the annealing-cooling unit 5. The pot 7 is a container for retaining the hot-dipping bath 2, and a sync roll 8 is disposed in the pot 7. The spray nozzle 9 sprays a gas towards the steel sheet 1a. The spray nozzle 9 is disposed above the pot 7. The spray nozzle 9 is disposed at a position where a gas can be sprayed toward both surfaces of the steel sheet 1a pulled out of the pot 7. The cooling device 10 cools a molten plating metal attached to the steel sheet. As the cooling device 10, an air cooler, a mist cooler, or the like is provided, and the steel sheet 1a is cooled by this cooling device 10. In the temper rolling-shape correcting device 11, the steel sheet 1a in which a plating layer is formed is subjected to temper rolling and shape correcting. The temper rolling-shape correcting device 11 is provided with a skin pass mill for temper rolling of the steel sheet 1a, a tension leveler for shape correction of the steel sheet 1a after the temper rolling, and the like.

In a hot-dipping treatment using this hot-dipping apparatus, the steel sheet 1a is unwound from the feeder 3 and continuously fed. This steel sheet 1a is heated by the heating furnace 4, and then conveyed to the annealing-cooling unit 5 under a reducing atmosphere. The steel sheet 1a is annealed in an annealing furnace, and at the same time, the surface is cleaned by removing rolling oil attached to the surface of the steel sheet 1a and the like and reducing and removing an oxide film. After that, the steel sheet 1a is cooled in the cooling zone. Next, the steel sheet 1a passes through the snout 6 and then enters the pot 7. The steel sheet 1a is immersed in the hot-dipping bath 2 in the pot 7. The steel sheet 1a is supported by the sync roll 8 in the pot 7, and as a result, the conveying direction is changed upward, and the steel sheet 1a is pulled out of the hot-dipping bath 2. As a result, the molten plating metal is attached to the steel sheet 1a.

Subsequently, a gas is sprayed toward the both surfaces of the steel sheet 1a by the spray nozzle 9. Thus, the amount of the hot-dipping plate attached to the steel sheet 1a is adjusted. Such a method in which the attached amount is adjusted by spraying a gas is referred to as gas wiping method. It is preferable that the amount of molten plating metal attached including the amount of molten plating metal on both surfaces of the steel sheet 1a be adjusted within a range of 40 to 200 g/m$^2$.

Examples of the gas (wiping gas) sprayed to the steel sheet 1a in the gas wiping method may include air, nitrogen, argon, helium, and steam. These wiping gases may be sprayed to the steel sheet 1a after preheating. In the embodiment, the surface oxidation and concentrating of Mg in the molten plating metal (oxidation of Mg and increase in concentration of Mg in the surface layer of the molten plating metal) are essentially suppressed by using the hot-dipping bath 2 having a specific composition. Therefore, even if oxygen is contained in the wiping gas or oxygen is contained in an air flow in association with spraying of the wiping gas, the amount of plating attached (amount of molten plating metal attached to the steel sheet 1a) can be adjusted without impairing the effect of the present invention.

A method in which the amount of the plating attached is adjusted is not limited to the gas wiping method described above, and various methods for controlling the amount of attached plating can be applied. Examples of the method for controlling the amount other than the gas wiping method may include a roller squeezing method in which the steel sheet 1a is passed through a pair of rollers disposed directly above a bath surface of the hot-dipping bath 2, a method in which the molten plating metal is wiped by a shielding plate that is disposed in the vicinity of the steel sheet 1a pulled out of the hot-dipping bath 2, an electromagnetic wiping method in which a force that causes the molten plating metal attached to the steel sheet 1a to move downward using an electromagnetic force is applied, and a method in which the amount of plating attached is adjusted using dropping due to the natural gravity without applying an external force. Two or more types of these methods of adjusting the amount of attached plating may be used in combination.

Next, the steel sheet 1a is conveyed further upward beyond the location of the spray nozzle 9, and then conveyed downward so as to be turned back by supporting the steel sheet 1a by two conveying rollers 15. Specifically, the steel sheet 1a is conveyed on an inverse U-shaped route. In this inverse U-shaped route, the steel sheet 1a is cooled by air cooling, mist cooling, or the like by the cooling device 10. As a result, the molten plating metal attached to the surface of the steel sheet 1a is solidified to form a plating layer.

In order to completely finish solidification of the molten plating metal by cooling by the cooling device 10, it is preferable that the molten plating metal on the steel sheet 1a be cooled by the cooling device 10 so that the surface temperature of the molten plating metal (or the plating layer) is 300° C. or lower. For example, the surface temperature of the molten plating metal is measured by a radiation thermometer. In order to thus form the plating layer, it is preferable that the cooling rate between pulling of the steel sheet 1a out of the hot-dipping bath 2 and cooling of the surface of the molten plating metal on the steel sheet 1a to 300° C. fall within a range of 5 to 100° C./sec. In order to control the cooling rate of the steel sheet 1a, it is preferable that the cooling device 10 have a temperature control function for adjusting the temperature of the steel sheet 1a along a conveying direction and a sheet widthwise direction. The cooling device 10 may be divided into a plurality of units along the conveying direction of the steel sheet 1a. In FIG. 1, there are provided a primary cooling device 101 that cools the steel sheet 1a on a route where the steel sheet 1a is conveyed further upward beyond the location of the spray nozzle 9, and a secondary cooling device 102 that cools the steel sheet 1a on the downstream side from the primary cooling device 101. The primary cooling device 101 and the secondary cooling device 102 may be divided into a plurality of units. In this case, for example, the primary cooling device 101 is capable of cooling the steel sheet 1a until the temperature of the molten plating metal reaches a temperature of 300° C. or lower, and the secondary cooling device 102 is capable of cooling the steel sheet 1a so that the temperature at which the steel sheet 1a is introduced into the temper rolling-shape correcting device 11 is 100° C. or lower.

During the process of cooling the steel sheet 1a, it is preferable that the cooling rate of the surface of the molten plating metal at which the surface temperature of the molten plating metal on the steel sheet 1a is 500° C. or higher be 50° C./sec or less. In this case, deposition of the Si—Mg phase on the surface of the plating layer is especially suppressed. Thus, the occurrence of running is suppressed. The reason in which the cooling rate at this temperature range affects deposition behavior of the Si—Mg phase is not necessarily clear at present. However, when the cooling rate at this temperature range is high, the temperature gradient in the thickness direction of the molten plating metal is increased. Therefore, the deposition of the Si—Mg phase is preferentially promoted on the surface of the molten plating metal on a side where the temperature is lower. Accordingly, it is considered that the amount of the Si—Mg phase deposited on the outermost surface of the plating is large. The cooling rate at this temperature range is more preferably 40° C./sec or less, and particularly preferably 35° C./sec or less.

In the temper rolling-shape correcting device 11, the cooled steel sheet 1a is subjected to temper rolling, followed by shape correcting. The rolling reduction ratio by temper rolling preferably falls within a range of 0.3 to 3%. The elongation ratio of the steel sheet 1a by shape correcting is preferably 3% or less.

Subsequently, the steel sheet 1a is wound up by the winder 12, and the coil 14 of the steel sheet 1a is held by this winder 12.

During this hot-dipping treatment, it is preferable that the temperature of the hot-dipping bath 2 in the pot 7 be higher than the solidification starting temperature of the hot-dipping bath 2 and equal to or lower than a temperature that is higher than the solidification starting temperature by 40° C. It is more preferable that the temperature of the hot-dipping bath 2 in the pot 7 be higher than the solidification starting temperature of the hot-dipping bath 2 and equal to or lower than a temperature that is higher than the solidification starting temperature by 25° C. When the upper limit of the temperature of the hot-dipping bath 2 is thus limited, a time required from pulling of the steel sheet 1a out of the hot-dipping bath 2 to solidification of the molten plating metal attached to the steel sheet 1a is shortened. As a result, a time when the molten plating metal attached to the steel sheet 1a is in a flowable state is also shortened. Therefore, wrinkles are hardly further formed in the plating layer. When the temperature of the hot-dipping bath 2 is equal to or lower than a temperature that is higher than the solidification starting temperature of the hot-dipping bath 2 by 20° C., wrinkling in the plating layer is particularly significantly suppressed.

Figure 2:
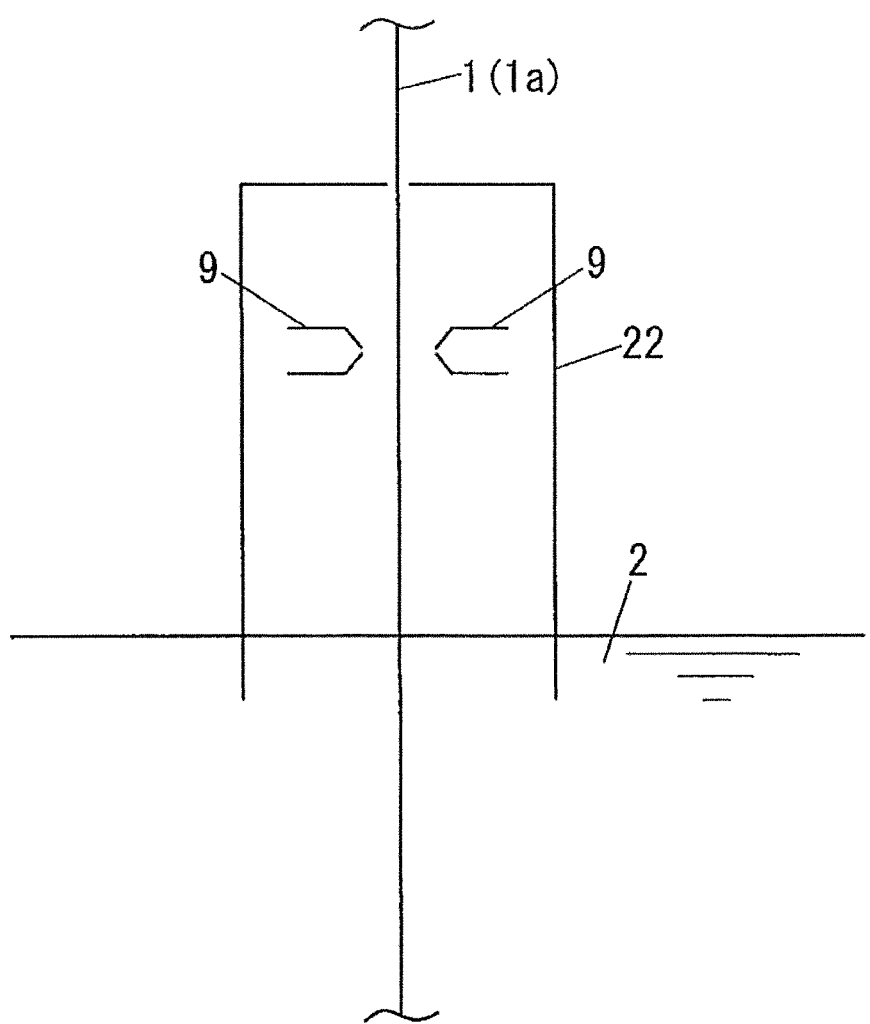
FIG. 2 is a partial schematic view illustrating another example of the hot-dipping apparatus.

When the steel sheet 1a is pulled out of the hot-dipping bath 2, the steel sheet 1a may be pulled into a non-oxidative atmosphere or a low oxidative atmosphere, and the steel sheet 1a may be subjected to the gas wiping method in the non-oxidative atmosphere or the low oxidative atmosphere to adjust the amount of the attached molten plating metal. In order to achieve this, it is preferable that, as illustrated in FIG. 2, for example, a route of conveying the steel material 1 pulled out of the hot-dipping bath 2 on the upstream side of hot-dipping bath 2 (route of conveying the steel sheet upwardly from the hot-dipping bath 2) be surrounded by a hollow member 22 and the inside of the hollow member 22 be filled with the non-oxidative gas such as nitrogen gas or the low oxidative gas. The non-oxidative gas or the low oxidative gas means a gas of which the oxygen concentration is lower than that of air. The oxygen concentration of the non-oxidative gas or the low oxidative gas is preferably 1,000 ppm or less. The atmosphere that is filled with the non-oxidative gas or the low oxidative gas represents a non-oxidative atmosphere or a low oxidative atmosphere, respectively. In this atmosphere, an oxidation reaction is suppressed. The spray nozzle 9 is disposed inside this hollow member 22. The hollow member 22 is provided so as to surround the route of conveying the steel material 1 from the inside of the hot-dipping bath 2 (the upper portion of the hot-dipping bath 2) over the hot-dipping bath 2. Moreover, it is preferable that a gas sprayed from the spray nozzle 9 be also the non-oxidative such as nitrogen gas or the low oxidative gas. In this case, since the steel sheet 1a pulled out of the molten plating metal 2 is exposed to the non-oxidative atmosphere or the low oxidative atmosphere, oxidation of the molten plating metal attached to the steel sheet 1a is suppressed, and an Mg-based oxide film is further unlikely to be formed on the surface layer of this molten plating metal. Therefore, the formation of wrinkles in the plating layer is further suppressed. Instead of using the hollow member 22, a portion or all of the hot-dipping apparatus that includes the route of conveying the steel sheet 1a may be disposed in the non-oxidative atmosphere or the low oxidative atmosphere.

It is preferable that after the hot-dipping treatment, the steel sheet 1a be subjected to an averaging treatment. In this case, the workability of the surface-treated steel is further improved. The overaging treatment is carried out by holding the steel sheet 1a within a fixed temperature range for a fixed period of time.

Figure 3:
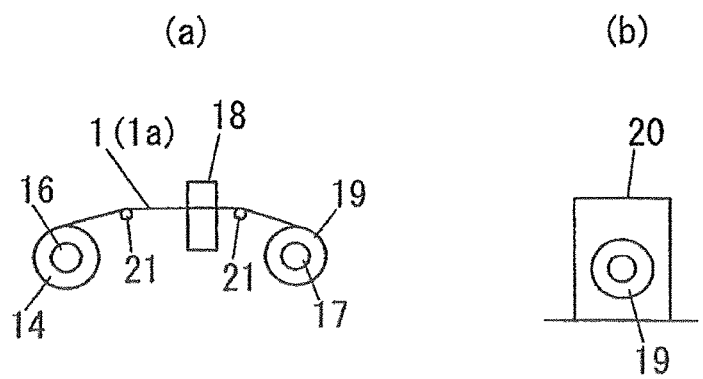
FIG. 3 is a schematic view illustrating an example of a heater and a thermal insulation container used for an averaging treatment.

FIG. 3 shows a device used in the overaging treatment. FIG. 3(a) shows a heater, and FIG. 3(b) shows a thermal insulation container 20. The heater is provided with a conveying device of continuously conveying the steel sheet 1a after the hot-dipping treatment. This conveying device includes a feeder 16, a winder 17, and a plurality of conveying rollers 21 similarly to the conveying device in the hot-dipping apparatus. A heating furnace 18 such as an induction heating furnace is provided on the route of conveying the steel sheet 1a by this conveying device. The thermal insulation container 20 is not particularly limited as it is a container that is capable of holding a coil 19 of the steel sheet 1a inside and has heat insulating properties. The thermal insulation container 20 may be a large container (thermal insulation chamber).

When the steel sheet 1a is subjected to the overaging treatment, the coil 14 of the hot-dipped steel sheet 1a is first carried from the winder 12 of the hot-dipping apparatus by a crane, a cart, or the like, and then held by the feeder 16 of the heater. In the heater, the steel sheet 1a is first unwound from the feeder 16 and continuously fed. The steel sheet 1a is heated to a temperature suitable for the overaging treatment by the heating furnace 18, and then wound up by the winder 17, and the coil 19 of the steel sheet 1a is held by this winder 17.

Subsequently, the coil 19 of the steel sheet 1a is carried from the winder 17 by a crane, a cart, or the like, and held in the thermal insulation container 20. The coil 19 of the steel sheet 1a is held in this thermal insulation container 20 for a fixed period of time. Thus, the steel sheet 1a is subjected to the overaging treatment.

According to the present embodiment, the plating layer formed on the surface of the steel sheet 1a contains Mg, and a slight amount of Mg-based oxide film is present on the surface of the plating layer. Therefore, even when the plating layer is laminated on the plating layer in a coil of the steel sheet 1a during the overaging treatment, baking or welding hardly occurs between the plating layers. Accordingly, even when the heat-retention time during the overaging treatment is long or the heat-retention temperature is high, baking hardly occurs, and the steel sheet 1a may be subjected to sufficient overaging treatment. As a result, the workability of the hot-dipped steel plate is highly improved, and the efficiency of the overaging treatment is improved.

In the overaging treatment, it is preferable that the temperature of the steel sheet 1a after heating especially by the heater fall within a range of 180 to 220° C., that is, the steel sheet be conveyed from the outside of the thermal insulation container to the inside of the thermal insulation container in a state where the temperature of the steel sheet 1a falls within the above-mentioned range. It is preferable that the retention time y (hr) of the steel sheet 1a in the thermal insulation container satisfy the following equation (1).

$$5.0 \times 10^{22} \times t^{-10.0} \leq y \leq 7.0 \times 10^{24} \times t^{-10.0} \tag{1}$$

(Provided that $150 \leq t \leq 250$.)

In equation (1), t (° C.) represents the temperature (retention temperature) of the steel sheet 1a at the retention time y (hr), and when temperature in the steel sheet 1a is varied, the t (° C.) is the lowest temperature.

In the present embodiment, the hot-dipping apparatus and the heater are separate devices. However, when the hot-dipping apparatus is provided with a heating furnace 21, the hot-dipping apparatus may also function as the heating furnace. These devices may be appropriately designed or modified by adding, omitting, or substituting various elements, if necessary. The hot-dipping apparatus and heater according to the embodiment are suitable for a case where the steel material 1 is the steel sheet 1a. However, the configuration of the hot-dipping apparatus, the heater, and the like can be variously designed or modified according to the form, and the like of the steel material 1. When the steel material 1 is subjected to a plating pre-treatment, this plating pre-treatment can also be variously modified according to the type, the form, and the like of the steel material 1.

The steel material 1 that is subjected to the hot-dipping treatment or further subjected to the overaging treatment is subjected to a chromate-free chemical conversion treatment over the plating layer. On the chemical conversion treatment layer, a coating film is formed using a coating composition. The coating composition of the present invention includes a coating film-forming resin (a), a cross-linking agent (b), at least one type of vanadium compound (c) selected from the group consisting of alkaline earth metal vanadates, and trimagnesium phosphate (d). If necessary, an additive such as an adhesion-improving component or an extender pigment may be contained. To the coating film, another coating may be applied as a top coat.

(Regarding Coating Film-Forming Resin (a))

The coating film-forming resin (a) used in the coating composition of the present invention is a thermosetting resin. The thermosetting resin is not particularly limited as long as it is a resin having a functional group capable of reacting with the cross-linking agent (b) described below and a coating film-forming ability. Examples thereof may include resins including an epoxy resin and a modified product thereof (an acrylic-modified epoxy resin, etc.); a polyester resin and a modified product thereof (a urethane-modified polyester resin, an epoxy-modified polyester resin, a silicone-modified polyester resin, etc.); an acrylic resin and a modified product thereof (a silicone-modified acrylic resin, etc.); a urethane resin and a modified product thereof (an epoxy-modified urethane resin, etc.); a phenolic resin and a modified product thereof
(an acrylic-modified phenolic resin, an epoxy-modified phenolic resin, etc.); a phenoxy resin; an alkyd resin and a modified product thereof (a urethane-modified alkyd resin, an acrylic-modified alkyd resin, etc.); a fluororesin; a polyphenylene ether resin; a polyamideimide resin; and a polyetherimide resin. One type of the resin may be used alone, or two or more types thereof may be used in combination.

Among these, a thermosetting resin such as an epoxy resin, a polyester resin, or a modified product thereof may be used as the coating film-forming resin (a) from the viewpoint of bending workability of the coating film obtained, and balance of moisture resistance, corrosion resistance, and weather resistance of the coating film. One type or more selected from the resins described above can be used. It is preferable that one type or more selected from a hydroxy group-containing epoxy resin, a hydroxy group-containing polyester resin, and modified products of these containing a hydroxy group be used as the thermosetting resin. When the epoxy resin, the polyester resin, and the modified products thereof have a hydroxy group, various types of amino resin or various types of isocyanate compound can be selected as the cross-linking agent (b). This is particularly preferable since various physical properties can be imparted to the coating film by selecting the cross-linking agent (b) having desired properties from various cross-linking agents (b).

The number-average molecular weight (Mn) of the aforementioned hydroxy group-containing epoxy resin (including a modified product of the hydroxy group-containing epoxy resin) is preferably 1,400 to 15,000, more preferably 2,000 to 10,000, and particularly preferably 2,000 to 4,000. The glass transition temperature (Tg) of the aforementioned hydroxy group-containing epoxy resin is preferably 60 to 120° C., and more preferably 60 to 85° C. The number-average molecular weight (Mn) of the aforementioned hydroxy group-containing polyester resin (including a modified product of the hydroxy group-containing polyester resin) is preferably 1,800 to 40,000, more preferably 2,000 to 30,000, and particularly preferably 10,000 to 20,000. The glass transition temperature (Tg) of the aforementioned hydroxy group-containing polyester resin is preferably 0 to 80° C., and more preferably 10 to 40° C. When the number-average molecular weight (Mn) of the hydroxy group-containing epoxy resin and/or hydroxy group-containing polyester resin used falls within the aforementioned range, a crosslinking reaction with the cross-linking agent (b) described below sufficiently proceeds, whereby the moisture resistance of the coating film becomes sufficient. Further, as a result, the corrosion resistance can be ensured. In addition, the coating composition obtained is appropriately viscous, and the handling property is improved. Further, elution of the vanadium compound and trimagnesium phosphate contained in the coating film is appropriate, and the corrosion resistance under acidic environment conditions is favorable. Therefore, this is preferable. When the glass transition temperature (Tg) of the hydroxy group-containing epoxy resin and/or hydroxy group-containing polyester resin used falls within the aforementioned range, the moisture permeability of the coating film is not excessively increased, the moisture resistance of the coating film is sufficient, and the corrosion resistance is favorable.

Examples of the aforementioned hydroxy group-containing epoxy resin (including a modified product of the hydroxy group-containing epoxy resin) may include product name "jER1004," "jER1007," "E1255HX30" (bisphenol A skeleton), and "YX8100BH30" available from Mitsubishi Chemical Corporation (herein "jER" is registered trademark). Examples of the hydroxy group-containing polyester resin (including a modified product of the hydroxy group-containing polyester resin) may include product name "BECKOLITE 47-335" available from DIC Corporation, product name "VYLON 220," "VYLON UR3500," "VYLON UR5537," and "VYLON UR8300" available from Toyobo Co., Ltd. (herein, "VYLON" is registered trademark).

The number-average molecular weight (Mn) used herein is a value calculated from a chromatogram measured by gel permeation chromatography (GPC) on the basis of molecular weight of a standard polystyrene. The glass transition temperature (Td) used herein is a value measured by a thermal analysis device (product name "TMA100/SSC5020" manufactured by Seiko Instruments Inc.).

The content of the coating film-forming resin (a) in the coating composition of the present invention in the total solid content is usually 10 to 80% by mass, and preferably 20 to 70% by mass. When the content is 10% by mass or more, the bending workability, coating workability, and coating film strength are favorable. When the content of the coating film-forming resin (a) is 80% by mass or less, sufficient corrosion resistance can be obtained.

As a resin other than the coating film-forming resin (a), the coating composition of the present invention may contain a thermoplastic resin (j). Examples of the thermoplastic resin (j) may include a chlorinated olefinic resin such as chlorinated polyethylene and chlorinated polypropylene; a homopolymer or a copolymer including vinyl chloride, vinyl acetate, vinylidene chloride, or the like as a monomer component; a cellulose resin; an acetal resin; an alkyd resin; a chlorinated rubber-based resin; a modified polypropylene resin (an acid anhydride-modified polypropylene resin, etc.); and a fluororesin (for example, a vinylidene fluoride resin, a vinyl fluoride resin, a copolymer of fluorinated olefin with vinyl ether, and a copolymer of fluorinated olefin with vinyl ester). One type of the thermoplastic resin (j) may be used alone, or two or more types thereof may be used in combination. When the thermoplastic resins (j) are used in combination, the coating film physical properties can be prepared into desired properties.

(Regarding Cross-Linking Agent (b))

The cross-linking agent (b) is reacted with the thermosetting resin, to form a cured coating film. Examples of the cross-linking agent (b) may include a blocked polyisocyanate compound (f) in which an isocyanate group of a polyisocyanate compound is blocked with an active hydrogen-containing compound, an amino resin (g), and a phenolic resin. Among these, it is preferable that one type or more selected from the group consisting of the blocked polyisocyanate compound (f) and the amino resin (g) having one or more methylol groups or imino groups on average in one molecule be used.

As the aforementioned polyisocyanate compound and a polyisocyanate compound constituting the aforementioned blocked polyisocyanate compound (f) are not particularly limited, and a conventionally known polyisocyanate compound can be used. Examples thereof may include 1,4-tetramethylene diisocyanate, 1,6-hexamethylene diisocyanate, 1,12-dodecamethylene diisocyanate, cyclohexane-1,3 or 1,4-diisocyanate, 1-isocyanato-3-isocyanatomethyl-3,5,5-trimethylcyclohexane (also known as isophorone diisocyanate; IPDI), dicyclohexylmethane-4,4'-diisocyanate (also known as hydrogenated MDI), 2- or 4-isocyanatocyclohexyl-2'-isocyanatocyclohexyl methane, 1,3- or 1,4-bis-(isocyanatomethyl)-cyclohexane, bis-(4-isocyanato-3-methylcyclohexyl)methane, 1,3- or 1,4-α,α,α'α'-tetramethylxylylene diisocyanate, 2,4- or 2,6-disocyanatotoluene, 2,2'-, 2,4'-, or 4,4'-diisocyanatodiphenylmethane (MDI), 1,5-naphthalene diisocyanate, p- or m-phenylene diisocyanate, xylene diisocyanate, and diphenyl-4,4'-diisocyanate. Further, a cyclic polymer (isocyanurate type), an isocyanurate-biuret product (biuret type), or an adduct type of each diisocyanate may be used. One type of the polyisocyanate compound may be used alone, or two or more types thereof may be used in combination. An isocyanurate-type polyisocyanate compound is one preferably used in the present invention.

In particular, as the polyisocyanate compound, an aromatic polyisocyanate compound containing one or more aromatic functional group in one molecule is preferably used. When the aromatic polyisocyanate compound is used, the moisture resistance of the coating film can be improved, and the coating film strength can be enhanced. Examples of the aromatic polyisocyanate compound preferably used may include 2,4- or 2,6-diisocyanatotoluene (TDI), 2,2'-, 2,4'-, or 4,4'-diisocyanatodiphenylmethane (MDI), xylene diisocyanate (XDI), and naphthalene diisocyanate (NDI).

The isocyanate group content ratio of the polyisocyanate compound constituting the blocked polyisocyanate compound (f) measured in accordance with JIS K 7301-1995 is usually 3 to 20%, and preferably 5 to 15% in the solid content of the polyisocyanate compound. It is preferable that the isocyanate group content ratio be equal to or more than the lower limit of the aforementioned preferable range since the curability of the coating film is sufficient. It is preferable that the isocyanate group content ratio be equal to or less than the upper limit of the aforementioned preferable range since the crosslinking density of the coating film obtained is appropriate and the corrosion resistance is favorable.

Examples of the active hydrogen-containing compound (blocking agent) used in the aforementioned blocked polyisocyanate compound (f) may include, but not particularly limited to, compounds having an —OH group (alcohols, phenols, etc.), a =N—OH group (oximes), or a =N—H group (amines, amides, imides, lactams, etc.), compounds having a —CH$_2$— group (active methylene group), and azoles. Examples thereof may include phenol, cresol, xylenol, ε-caprolactam, σ-valerolactam, γ-butyrolactam, methanol, ethanol, n-, i-, or t-butyl alcohol, ethylene glycol monoethyl ether, ethylene glycol monobutyl ether, diethylene glycol monoethyl ether, propylene glycol monomethyl ether, benzyl alcohol, formamidoxime, acetaldoxime, acetoxime, methyl ethyl ketoxime, diacetyl monooxime, benzophenone oxime, cyclohexane oxime, dimethyl malonate, ethyl acetoacetate, acetylacetone, and pyrazole. One type of the active hydrogen-containing compound may be used alone, or two or more types thereof may be used in combination.

A thermal dissociation temperature of the blocked polyisocyanate compound (f) depends on the type of the polyisocyanate compound constituting the blocked polyisocyanate compound (f) and the active hydrogen-containing compound, the presence or absence of a catalyst, and the amount of the catalyst. In the present invention, the blocked polyisocyanate compound (f) in which the thermal dissociation temperature (in the absence of a catalyst) is 120 to 180° C. is preferably used. When the blocked polyisocyanate compound (f) showing a dissociation temperature within this range is used, the stability of the coating can be improved, and the crosslinking reactivity with the coating film-forming resin (a) is excellent. Therefore, a coating film having favorable moisture resistance can be obtained. Examples of the blocked polyisocyanate compound (f) having a dissociation temperature of 120 to 180° C. may include product name "Desmodur BL3175" and "DESMOTHERM 2170" available from Sumika Bayer Urethane Co., Ltd. (herein, "Desmodur" and "DESMOTHERM" are registered trademark).

Examples of the aforementioned amino resin (g) may include a melamine resin and a urea resin. Among these, a melamine resin is preferably used. The "melamine resin" means a thermosetting resin generally obtained by synthesis of melamine and aldehyde, and has three reactive functional groups —NX$^1$X$^2$ in one molecule of triazine nucleus. Examples of the melamine resin may include four types including a complete alkyl type melamine resin containing —N—(CH$_2$OR)$_2$ [wherein R is alkyl group, the same applies hereinafter] as the reactive functional group; a methylol group type melamine resin containing —N—(CH$_2$OR)(CH$_2$OH) as the reactive functional group; an imino group type melamine resin containing —N—(CH$_2$OR)(H) as the reactive functional group; and a methylol/imino group type melamine resin containing —N—(CH$_2$OR)(CH$_2$OH) and —N—(CH$_2$OR)(H) or —N—(CH$_2$OH)(H) as the reactive functional group.

In the present invention, it is preferable that among the aforementioned melamine resins, a melamine resin having one or more methylol groups or imino groups on average relative to a triazine nucleus (hereinafter referred to as melamine resin (g1)), that is, a methylol group type, an imino group type, or a methylol/imino group-type melamine resin, or a mixture thereof be used. The melamine resin (g1) has excellent crosslinking reactivity with the coating film-forming resin (a) even in the absence of a catalyst, and a coating film having favorable moisture resistance can be obtained. Examples of the melamine resin (g1) may include product name "MYCOAT 715" available from Nihon Cytec Industries Inc.

The content of the cross-linking agent (b) in the coating composition of the present invention is preferably 10 to 80% by mass, and more preferably 20 to 70% by mass, in terms of solid content, relative to 100% by mass of solid content of the coating film-forming resin (a). When the content (in terms of solid content) of the cross-linking agent (b) is 10% by mass or more relative to 100% by mass of solid content of the coating film-forming resin (a), the crosslinking reaction with the coating film-forming resin (a) sufficiently proceeds, the moisture permeability of the coating film is appropriate, the moisture resistance of the coating film is favorable, and the corrosion resistance is favorable. When the content (in terms of solid content) of the cross-linking agent (b) is 80% by mass or less relative to 100% by mass of solid content of the coating film-forming resin (a), elution of an anticorrosive pigment in the coating film is sufficient, and the corrosion resistance is favorable.

(Regarding Vanadium Compound (c))

The vanadium compound (c) as an anticorrosive pigment is at least one type of metal vanadate selected from the group consisting of an alkaline earth metal vanadate and magnesium vanadate. The vanadium compound (c) has a specific electrical conductivity. Specifically, the electrical conductivity of 1% by mass aqueous solution thereof at a temperature of 25° C. is 200 μS/cm to 2,000 μS/cm. When the vanadium compound (c) having an electrical conductivity within this range is used in a predetermined amount, a coating film having improved corrosion resistance and moisture resistance can be obtained. The vanadium compound (c) having an electrical conductivity within this range exhibits appropriate solubility. Therefore, corrosion of not only a coated surface but also an end surface of a substance to be coated (steel sheet, etc.) can be effectively prevented. When the electrical conductivity is less than 200 μS/cm, elution of the vanadium compound from the coating film to the substance to be coated (steel sheet, etc.) is reduced, and as a result, the corrosion resistance is reduced. When the electrical conductivity is more than 2,000 μS/cm, the moisture permeability of the coating film is excessively increased (water is easily penetrated into the coating film). Thus, the moisture resistance of the coating film is reduced, and as a result, the corrosion resistance is also reduced. The electrical conductivity of 1% by mass aqueous solution of the vanadium compound (c) is preferably 200 to 1,000 μS/cm. The valence of vanadium in the metal vanadate is any of 3, 4, and 5, and the vanadic acid includes any condensed vanadic acids such as ortho-vanadic acid, meta-vanadic acid, and pyrovanadic acid. It is preferable that the alkaline earth metal vanadate be calcium vanadate.

The "1% by mass aqueous solution" used herein represents a solution obtained by adding 1 g of sample (for example, the vanadium compound (c)) to 99 g of ion-exchanged water and stirring the mixture at room temperature for 4 hours. When the solubility of the added sample in water is less than 1% by mass, the added sample may not be completely dissolved in ion-exchanged water. The electrical conductivity described above is a value of electrical conductivity of 1% by mass aqueous solution at a temperature of 25° C. measured by an electrical conductivity meter (for example, "CM-30ET" manufactured by DKK-Toa Corporation).

The pH of 1% by mass aqueous solution of the aforementioned calcium vanadate is preferably 6.5 to 11.0, and more preferably 7.0 to 10.0. When the pH falls within this range, the corrosion resistance of the surface-treated steel of the present invention can be significantly enhanced. When the pH of 1% by mass aqueous solution of calcium vanadate is out of the aforementioned range, corrosion of base material of iron, zinc, aluminum, or the like may easily occur.

The "1% by mass aqueous solution" used herein has the same meaning as described above. The pH described above is a value obtained by measuring the pH of 1% by mass aqueous solution by a pH meter ("F-54" manufactured by Horiba Ltd.).

In the present invention, the content of the aforementioned vanadium compound (c) is more than 50% by mass and 150% by mass or less, and preferably 60 to 100% by mass, relative to 100% by mass of a total of a solid content of the coating film-forming resin (a) and a solid content of the cross-linking agent (b) to be described later. When the content of the vanadium compound (c) is 50% by mass or less relative to 100% by mass of the total solid content of the coating film-forming resin (a) and the cross-linking agent (b), elution of the vanadium compound (c) from the coating film into the steel material 1 is reduced, and as a result, the corrosion resistance is reduced. When the content of the vanadium compound (c) is more than 150% by mass, the moisture permeability of the coating film is excessively increased, whereby water is easily penetrated into the coating film. Thus, the moisture resistance of the coating film is reduced. With the reduction in moisture resistance, the corrosion resistance is also reduced. Thus, in the present invention, when the ratio of the specific vanadium compound (c) as the anticorrosive pigment to the resin solid content composed of the coating film-forming resin (a) and the cross-linking agent (b) is adjusted within an appropriate range, both the moisture resistance and the corrosion resistance can be highly achieved.

A method of preparing the vanadium compound used in the present invention is not particularly limited, and any method may be used. For example, when the vanadium compound (c) is calcium vanadate, calcium vanadate can be obtained by mixing a calcium compound, vanadate, and/or vanadium pentoxide in water to react them. A solid (usually, white solid) obtained by the reaction may be subjected to washing with water, dehydration, drying, and pulverization treatment, if necessary.

Examples of the calcium compound for preparation of calcium vanadate may include calcium carbonate, calcium hydroxide, calcium oxide, calcium chloride, calcium nitrate, calcium acetate, and calcium sulfate. Further, a calcium compound of organic acid such as calcium formate is also suitably used. Examples of vanadate may include, but not limited to, potassium vanadate, sodium vanadate, and ammonium vanadate.

When the calcium compound is reacted with vanadate to prepare calcium vanadate, calcium vanadate exhibiting desired electrical conductivity can be obtained by adjusting use ratio of the calcium compound, the vanadate, and/or vanadium pentoxide. When the electrical conductivity is adjusted within the aforementioned range, two or more types of calcium vanadates exhibiting different electrical conductivities may be uniformly mixed.

When the vanadium compound (c) is magnesium vanadate, magnesium vanadate can be obtained by mixing a magnesium compound, vanadate, and/or vanadium pentoxide in water to react them in a similar manner. A solid (usually, white solid) obtained by the reaction may be subjected to washing with water, dehydration, drying, and pulverization treatment, if necessary.

Examples of the magnesium compound for preparation of magnesium vanadate may include magnesium carbonate, magnesium hydroxide, magnesium oxide, magnesium chloride, magnesium nitrate, magnesium acetate, and magnesium sulfate. Further, a magnesium compound of an organic acid such as magnesium formate is also suitably used. Examples of the vanadate may include, but not limited to, potassium vanadate, sodium vanadate, and ammonium vanadate.

Similarly, when the magnesium compound is reacted with the vanadate and/or vanadium pentoxide to prepare magnesium vanadate, magnesium vanadate exhibiting desired electrical conductivity can be obtained by adjusting the use ratio of the magnesium compound, the vanadate, and/or vanadium pentoxide. In order to adjust the electrical conductivity within the aforementioned range, two or more types of magnesium vanadates exhibiting different electrical conductivities may be uniformly mixed.

(Regarding Trimagnesium Phosphate (d))

Figure 4:
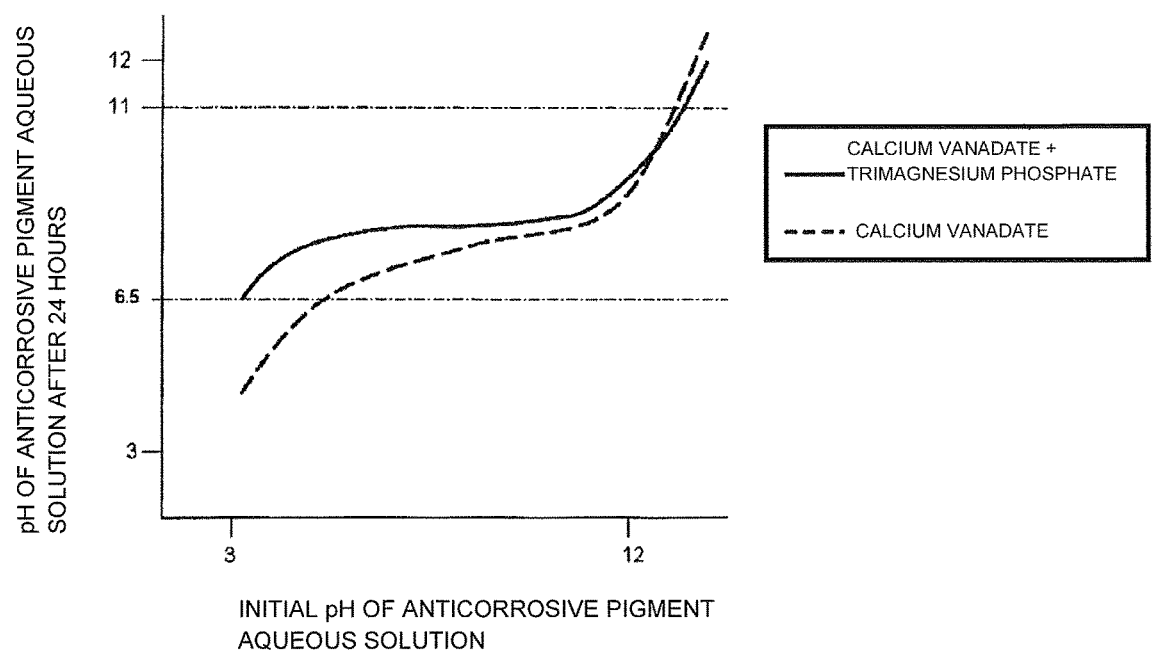
FIG. 4 is a view illustrating pH buffering capacities of an aqueous solution including 0.7% by mass of calcium vanadate as the vanadium compound (c) and 0.3% by mass of trimagnesium phosphate (d) and an aqueous solution of 1.0% by mass of calcium vanadate as the vanadium compound (c) at an acidic region.

The trimagnesium phosphate (d) is commercially available as an octahydrate generally composed of "$Mg_3(PO_4)_2 \cdot 8H_2O$." The trimagnesium phosphate (d) has high pH buffering capacity at an acidic region. As shown in FIG. 4, for example, the pH buffering capacity at the acidic region during use of the trimagnesium phosphate (d) with the aforementioned vanadium compound (c) is especially higher than that during use of only the aforementioned vanadium compound (c). Therefore, the use of the trimagnesium phosphate (d) with the aforementioned vanadium compound (c) exerts an effect of improving the corrosion resistance of the coating film under the acidic environment conditions. Herein, FIG. 4 shows the pH buffering actions of the aqueous solution of 0.7% by mass of calcium vanadate as the vanadium compound (c) and 0.3% by mass of trimagnesium phosphate (d), and the aqueous solution of 1.0% by mass of calcium vanadate as the vanadium compound (c) at the acidic region. An experimental method for the pH buffering action shown in FIG. 4 is as follows.

[Experimental Method]:

1. The initial pH of the aqueous solution is adjusted using hydrochloric acid or sodium hydroxide.

2. To the aqueous solution having the adjusted initial pH, 1% by mass of anticorrosive pigment is added and stirred.

3. The pH of the aqueous solution of 1% by mass of the anticorrosive pigment prepared in the aforementioned item 2 is measured after 24 hours.

When the anticorrosive pigment in which the pH 24 hours after preparation of aqueous solution falls within a range of 6.5 to 11 shown by a long dashed dotted line in FIG. 4 is used, a coating film exhibiting high corrosion resistance is obtained in a case of a cold-rolled steel sheet or a plated steel sheet including zinc or aluminum. Therefore, when the trimagnesium phosphate is used with calcium vanadate, the buffering action at the acidic region where the pH is near 3 is high as compare with use of only calcium vanadate, as shown in FIG. 4. Accordingly, it is assumed that the corrosion resistance of a coated steel sheet having a coating film formed using a coating film composition containing calcium vanadate and trimagnesium phosphate at the acidic environment is improved.

When the aforementioned octahydrate is used, the content of the trimagnesium phosphate (d), which is converted on the basis of the mass of "$Mg_3(PO_4)_2$," is 1 to 150% by mass relative to 100% by of the total of the solid content of the coating film-forming resin (a) and the solid content of the cross-linking agent (b).

When the content is less than 1% by mass, elution of the trimagnesium phosphate (d) from the coating film into the steel 1 is reduced. As a result, the pH buffering capacity is reduced, and the corrosion resistance under the acidic environment conditions is reduced. When the content of the trimagnesium phosphate (d) is more than 150% by mass, the moisture permeability of the coating film is excessively increased, whereby water is easily penetrated into the coating film. Thus, the moisture resistance of the coating film is reduced. With the reduction in moisture resistance, the corrosion resistance under the acidic environment conditions is also reduced.

In the present invention, the trimagnesium phosphate (d) is used in consideration of the pH buffering capacity at the acidic region. Tricalcium phosphate that is the tri-alkaline earth metal phosphate has a reduced amount of elution from the coating film into the steel material 1 as compared with trimagnesium phosphate. Therefore, when tricalcium phosphate is added in the same amount as that of trimagnesium phosphate, the pH buffering capacity at the acidic region is insufficient. As a result, the corrosion resistance under the acidic environment conditions is reduced. In a case of trilithium phosphate and trisodium phosphate which are the tri-alkaline metal phosphate, the moisture permeability of the coating film is excessively increased, whereby water is easily penetrated into the coating film. Thus, the moisture resistance of the coating film is reduced. With the reduction in moisture resistance, the corrosion resistance is also reduced. Of magnesium phosphate, the "trimagnesium phosphate" in which the pH in an aqueous solution is alkali has high pH buffering action at the acidic region as compared with monomagnesium phosphate ($Mg(H_2PO_4)_2 \cdot 4H_2O$) and dimagnesium phosphate ($MgHPO_4 \cdot 3H_2O$). The corrosion resistance of the steel material 1 having a coating film formed using a coating composition containing trimagnesium phosphate under the acidic environment conditions is improved.

The total content of the trimagnesium phosphate (d) and the vanadium compound (c), which is the total of the mass of the vanadium compound (c) and the mass of "$Mg_3(PO_4)_2$ of the trimagnesium phosphate (d)," is 51 to 210% by mass relative to 100% by mass of the total of the solid content of the coating film-forming resin (a) and the solid content of the cross-linking agent (b). When the total content of the trimagnesium phosphate (d) and the vanadium compound (c) falls within the aforementioned range, the vanadium compound (c) and the trimagnesium phosphate (d) are eluted in appropriate amounts from the coating film into the steel material 1. Therefore, the corrosion resistance is maintained, and the moisture resistance of the coating film is also maintained.

The mass ratio of the vanadium compound (c) to the trimagnesium phosphate (d) is 60:150 to 150:1, preferably 60:50 to 150:50, and more preferably 60:25 with the trimagnesium phosphate (d) converted as "$Mg_3(PO_4)_2$." When the mass ratio of the vanadium compound (c) to the trimagnesium phosphate (d) with the trimagnesium phosphate (d) converted as "$Mg_3(PO_4)_2$" is 60:150 to 150:1, both the corrosion resistance under acidic conditions and the corrosion resistance under usual neutral conditions can be made favorable.

(Regarding Adhesion-Improving Component)

The coating composition of the present invention may further contain the adhesion-improving component that is at least one type of compound selected from the group consisting of a silane-based coupling agent, a titanium-based coupling agent, and a zirconium-based coupling agent. When the adhesion-improving component is added, the adhesion to the substance to be coated can be improved, and the moisture resistance of the coating film can be further improved.

The aforementioned adhesion-improving component is not particularly limited, and conventionally known adhesion-improving component can be used. Specific examples of suitably used adhesion-improving component may include a silane-based coupling agent such as product name "DOW CORNING TORAY Z-6011," and "DOW CORNING TORAY Z-6040" available from Dow corning Toray Co., Ltd. (herein "DOW CORNING" is registered trademark); a titanium-based coupling agent such as product name "ORGATIX TC-401," and "ORGATIX TC-750" available from Matsumoto Fine Chemical Co., Ltd.; and a zirconium-based coupling agent such as product name "ORGATIX ZC-580," and "ORGATIX ZC-700" available from Matsumoto Fine Chemical Co., Ltd. Among these, a silane-based coupling agent is preferably used.

The content of the adhesion-improving component is preferably 0.1 to 20% by mass relative to 100% by mass of the total solid content of the coating film-forming resin (a) and the cross-linking agent (b). When the content of the adhesion-improving component is 0.1% by mass or more, an effect of improving the moisture resistance is obtained. When the content of the adhesion-improving component is 20% by mass or less, the storage stability of the coating composition is favorable.

(Regarding Extender Pigment)

The coating composition of the present invention may further contain the extender pigment such as calcium carbonate, barium sulfate, clay, talc, mica, silica, alumina, and bentonite. When the extender pigment is added, the coating film strength can be enhanced as well as irregularities are formed on the surface of the coating film to improve the adhesion to top coating film. For these reasons, the moisture resistance is favorable. The content of the extender pigment is preferably 1 to 40% by mass relative to 100% by mass of the total solid content of the coating film-forming resin (a) and the cross-linking agent (b). When the content of the extender pigment is 1% by mass or more, the effect of improving the moisture resistance is obtained. When the content of the extender pigment is 40% by mass or less, the moisture permeability of the coating film is appropriate, whereby the moisture resistance of the coating film is favorable and the corrosion resistance is favorable.

(Regarding Curing Catalyst)

When the blocked polyisocyanate compound (f) and/or the polyisocyanate compound is used as the cross-linking agent (b), the coating composition of the present invention may contain a curing catalyst. Examples of the curing catalyst may include a tin catalyst, an amine catalyst, and a lead catalyst. Among these, an organotin compound is preferably used. As the organotin compound, for example, dibutyltin dilaurate (DBTL), dibutyltin oxide, tetra-n-butyl-1,3-diacetoxystannoxane, or the like can be used.

Similarly, when the melamine resin (g1) is used as the cross-linking agent (b), the coating composition of the present invention may contain the curing catalyst. Examples of the curing catalyst used in this case may include acid catalysts such as a carboxylic acid and a sulfonic acid. Among these, dodecylbenzenesulfonic acid, p-toluenesulfonic acid, or the like is preferably used.

The content of the aforementioned curing catalyst is usually 0.1 to 10% by mass, and preferably 0.1 to 1% by mass relative to 100% by mass of the total solid content of the coating film-forming resin (a) and the cross-linking agent (b). When the content of the curing catalyst is 0.1 to 10% by mass, the storage stability of the coating composition is favorable.

(Regarding Other Additives)

The coating composition of the present invention may contain other additives than the aforementioned components, if necessary. Examples of the other additives may include an anticorrosive pigment other than the aforementioned vanadium compound (c); an extender pigment other than the aforementioned extender pigments; a colorant such as a color pigment and a dye; a glitter pigment; a solvent; an ultraviolet ray absorber (a benzophenone-based ultraviolet ray absorber, etc.); an antioxidant (phenolic, sulfide-based, and hindered amine-based anti-oxidants, etc.); a plasticizer; a surface adjustment agent (silicone, organic polymer, etc.); a running inhibitor; a thickener; a lubricant such as wax; a pigment dispersant; a pigment wetting agent; a leveling agent; an anti-color separation agent; a precipitation inhibitor; a defoaming agent; a preservative; an anti-freezing agent; an emulsifier; a fungicide; an anti-microbial agent; and a stabilizer. One type of the additive may be used alone, or two or more types thereof may be used in combination.

As the anticorrosive pigment other than the aforementioned vanadium compound (c), a chromium-free anticorrosive pigment can be used. Examples thereof may include vanadium pentoxide, a molybdate pigment (zinc molybdate, strontium molybdate, etc.), a phosphomolybdate pigment (aluminum phosphomolybdate-based pigment, etc.), a calcium silica-based pigment, a phosphate-based anticorrosive pigment such as tripolyphosphate, and a chromium-free anticorrosive pigment such as a silicate-based pigment. One type of the anticorrosive pigment may be used alone, or two or more types thereof may be used in combination. Since the coating composition of the present invention contains a predetermined amount of the vanadium compound (c) having predetermined electrical conductivity and pH, the coating composition exhibits sufficiently high corrosion resistance. If necessary, the anticorrosive pigment other than the vanadium compound (c) as described above may be used within a range in which the moisture resistance, corrosion resistance, and chemical resistance of the coating film obtained are not impaired.

Examples of the aforementioned color pigment may include an inorganic color pigment such as titanium dioxide, carbon black, graphite, iron oxide, and coal dust; an organic color pigment such as phthalocyanine blue, phthalocyanine green, quinacridone, perylene, anthrapyrimidine, carbazole violet, anthrapyridine, azo orange, flavanthrone yellow, isoindoline yellow, azo yellow, indanthrone blue, dibromanthanthrone red, perylene red, azo red, and anthraquinone red; and aluminum powder, alumina powder, bronze powder, copper powder, tin powder, zinc powder, phosphide powder, and titanium fine particles. One type of the color pigment may be used alone, or two or more types thereof may be used in combination.

Examples of the aforementioned glitter pigment may include alumina foil, bronze foil, tin foil, gold foil, silver foil, titanium metal foil, stainless steel foil, alloy foil such as nickel-copper foil, and a foil pigment such as phthalocyanine blue foil. One type of the glitter pigment may be used alone, or two or more types thereof may be used in combination.

Examples of the aforementioned solvent may include water; a glycol-based organic solvent such as ethylene glycol monobutyl ether (butyl cellosolve), diethylene glycol monobutyl ether, triethylene glycol monoethyl ether, propylene glycol monomethyl ether, propylene glycol monoethyl ether, propylene glycol monopropyl ether, dipropylene glycol monomethyl ether, dipropylene glycol monoethyl ether, and propylene glycol monomethyl ether acetate; an alcohol-based organic solvent such as methanol, ethanol, and isopropyl alcohol; an ether-based organic solvent such as dioxane and tetrahydrofuran; an ester-based organic solvent such as 3-methoxybutyl acetate, ethyl acetate, isopropyl acetate, and butyl acetate; a ketone-based organic solvent such as methyl ethyl ketone, acetone, methyl isobutyl ketone, cyclohexanone, and isophorone; and N-methyl-2-pyrrolidone, toluene, pentane, iso-pentane, hexane, iso-hexane, cyclohexane, solvent naphtha, mineral spirit, and Solvesso 100 and Solvesso 150 (both are aromatic hydrocarbon solvents). One type of the solvent may be used alone, or two or more types thereof may be used in combination. The coating composition of the present invention may be an aqueous coating or an organic solvent-based coating.

The coating composition of the present invention can be prepared, for example, by mixing the coating film-forming resin (a), the cross-linking agent (b), the vanadium compound (c), the extender pigment, the adhesion-improving component, the curing catalyst, and the other additives using a mixer such as a roller mill, a ball mill, a bead mill, a pebble mill, a sand grind mil, a pot mill, a paint shaker, or a disperser. Alternatively, the coating composition of the present invention may be a two-part coating composed of a main agent component including the coating film-forming resin (a) and the vanadium compound (c) and a cross-linking agent component including the cross-linking agent (b).

The coating composition of the present invention can be used as an undercoating, which is also referred to as a primer. In this case, as a top coating, a publicly known material such as a polyester resin-based coating or a fluororesin-based coating can be used.

[2. Coating Film and Coating Steel Sheet]

As describe above, the coating film formed using the coating composition of the present invention is formed on a predetermined plating layer of a steel material (i.e., an aluminum-zinc alloy plating layer containing Al, Zn, Si, Cr, and Mg, wherein the Mg content is 0.1 to 10% by mass, the Cr content is 0.02 to 1.0% by mass, 0.2 to 15% by volume of Si—Mg phase is contained, the ratio of the mass of Mg in the Si—Mg phase to the total mass of Mg is 3% or more). Thus, a surface-treated steel sheet having corrosion resistance (especially, cut edge corrosion resistance) that is equal to or more than the conventional chromate treatment can be obtained.

As a method of applying the coating composition of the present invention, a conventionally known method such as a roll coater, an airless spray, an electrostatic spray, or a curtain flow coater may be adapted. The coating film of the present invention formed using the coating composition of the present invention can be formed by applying the coating composition to the plating layer of the steel material 1, followed by a baking treatment in which the coated substance is heated. Thus, the surface-treated steel of the present invention is obtained. The baking temperature is usually 180 to 250° C., and the baking time is usually 10 to 200 seconds.

The thickness (dry thickness) of the coating film (the coating film of the present invention) formed using the coating composition of the present invention is usually 1 to 30 μm, and preferably 1 to 10 μm.

Since the coating composition to form the coating film of the present invention contains a predetermined amount of the vanadium compound (c) having a predetermined electrical conductivity, the coating composition usually exhibits a wet resistance value of $10^5$ to $10^{12}$ $\Omega \cdot cm^2$. The wet resistance value of the coating film is varied depending on the types of the resin and the cross-linking agent used in the coating composition, the type and amount of the additive to be contained, the baking condition, and the like. However, the wet resistance value of the coating film that falls within the aforementioned range means that the coating film has appropriate moisture permeability and exhibits good moisture resistance. Specifically, a wet resistance value of less than $10^3$ $\Omega \cdot cm^2$ means that the moisture permeability of the coating film is excessively high and the moisture permeability is low. Therefore, blisters, peeling, or the like are likely to occur. A wet resistance value of more than $10^{12}$ $\Omega \cdot cm^2$ means that the moisture permeability of the coating film is excessively low. Therefore, the elution of the anticorrosive pigment in the coating film is inhibited, and the corrosion resistance tends to be reduced. The wet resistance value of the coating film of the present invention is preferably $10^6$ to $10^{11}$ $\Omega \cdot cm^2$. The wet resistance value of the coating film means a direct-current resistance value that is measured at a wave height ±0.5 V of the applied voltage after the coating film having a dry thickness of 15 μm is wetted by a 5% salt solution (NaCl aqueous solution) at 35° C. for 1 hour. Detailed conditions of measurement of wet resistance value of the coating film will be described in Examples described below.

Examples

The present inventor has found that the corrosion resistance (especially, cut edge corrosion resistance) that is equal to or more than that of the conventional chromate treatment is obtained by combination of the plating layer and the coating film according to the present invention. Thus, the present invention has been created. The effects of the present invention will be described specifically with reference to Examples and Comparative Examples. However, the present invention is not limited to the following Examples. In the following Examples, "parts" and "%" are on the basis of mass unless otherwise specified.

(Regarding Plating Layer)

A plating layer was formed by immersing a steel sheet in a molten metal. In Examples 1 to 2, 5 to 18, Comparative Examples 4 to 13, and Reference Example 1, components of the molten metal were adjusted so as to obtain a 55% Al-2% Mg-1.6% Si-0.03% Cr-zinc alloy plated steel sheet. In Example 3, components of the molten metal were adjusted so as to obtain a 55% Al-0.5% Mg-1.6% Si-0.03% Cr-zinc alloy plated steel sheet. In Example 4, components of the molten metal were adjusted so as to obtain a 55% Al-5% Mg-1.6% Si-0.03% Cr-zinc alloy plated steel sheet. In Comparative Example 1, components of the molten metal were adjusted so as to obtain a 55% Al-11% Mg-1.6% Si-0.03% Cr-zinc alloy plated steel sheet. In Comparative Example 14, components of the molten metal were adjusted so as to obtain a 55% Al-2% Mg-1.6% Si-0.01% Cr-zinc alloy plated steel sheet. In Comparative Example 15, components of the molten metal were adjusted so as to obtain a 55% Al-2% Mg-1.6% Si-1.1% Cr-zinc alloy plated steel sheet. In Comparative Example 2 and Reference Example 2, components of the molten metal were adjusted so as to obtain a 55% Al-1.6% Si-zinc alloy plated steel sheet. In Comparative Example 3, components of the molten metal were adjusted so as to obtain a hot-dip galvanized steel sheet.

(Regarding Coating Composition Layer)

(1) Preparation of Alkaline Earth Metal Vanadate

As an alkaline earth metal vanadate, calcium vanadate was used. Calcium vanadate was prepared as follows.

622 g of calcium carbonate ($CaCO_3$) and 378 g of vanadium pentoxide ($V_2O_5$) were added to 10 L of water, and the mixture was warmed to 60° C. and stirred at the same temperature for 2 hours. The obtained reaction product (white solid) was washed with water, dehydrated, dried at 100° C., and pulverized, to obtain calcium vanadate.

(Procedure of Measuring Electrical Conductivity and pH)

[i] 99 g of ion-exchanged water and 1 g of sample were added to a polyethylene narrow mouth bottle having been washed with ion-exchanged water.

[ii] A stirrer chip having been washed with ion-exchanged water was added, and the mixture was stirred at room temperature for 4 hours.

[iii] After the stirring, the electrical conductivity and pH were measured using an electrical conductivity meter (electrical conductivity meter "CM-30ET" manufactured by DKK-Toa Corporation) and a pH meter ("F-54" manufactured by Horiba Ltd.).

Details of anticorrosive pigments other than calcium vanadate are as follows.

1. "Sodium metavanadate": commercial reagent
2. "vanadium pentoxide": commercial reagent
3. "Shieldex C303": calcium ion-exchange silica fine particles available from Grace Japan K. K.
4. "Trimagnesium phosphate": commercial reagent
5. "Monomagnesium phosphate": commercial reagent
6. "Dimagnesium phosphate": commercial reagent
7. "Tricalcium phosphate": commercial reagent
8. "Magnesium vanadate": commercial reagent
9. "Strontium chromate": strontium chromate: available from Kikuchi Color & Chemicals Corporation (3) Preparation of Coating Composition A coating composition was prepared in accordance with each blending composition shown in Tables 1 to 4.

TABLE 1

| | | | EXAMPLE 1 | EXAMPLE 2 | EXAMPLE 3 |
|---|---|---|---|---|---|
| BASE MATERIAL | HOT-DIPPED STEEL MATERIAL | HOT-DIP 55% ALUMINUM-2% MAGNESIUM-1.6% SILICON-0.03% CHROMIUM-ZINC ALLOY PLATED STEEL SHEET | ○ | ○ | ○ |
| | | HOT-DIP 55% ALUMINUM-0.5% MAGNESIUM-1.6% SILICON-0.03% CHROMIUM-ZINC ALLOY PLATED STEEL SHEET | | | |
| | | HOT-DIP 55% ALUMINUM-5% MAGNESIUM-1.6% SILICON-0.03% CHROMIUM-ZINC ALLOY PLATED STEEL SHEET | | | |
| | | HOT-DIP 55% ALUMINUM-11% MAGNESIUM-1.6% SILICON-0.03% CHROMIUM-ZINC ALLOY PLATED STEEL SHEET | | | |
| | | HOT-DIP 55% ALUMINUM-2% MAGNESIUM-1.6% SILICON-0.01% CHROMIUM-ZINC ALLOY PLATED STEEL SHEET | | | |
| | | HOT-DIP 55% ALUMINUM-2% MAGNESIUM-1.6% SILICON-1.1% CHROMIUM-ZINC ALLOY PLATED STEEL SHEET | | | |
| | | HOT-DIP 55% ALUMINUM-1.6% SILICON-ZINC ALLOY PLATED STEEL SHEET | | | |
| | | HOT-DIP GALVANIZED STEEL SHEET | | | |
| COATING CONFIGURATION | PRETREATMENT | CHROMATE-FREE COATING PRETREATMENT | ○ | ○ | ○ |
| | (a) COATING FILM-FORMING RESIN | jER1007 (30% NONVOLATILE CONTENT) EPOXY RESIN | 233 | 233 | 233 |
| | | VYLON GK780 (NONVOLATILE CONTENT ADJUSTED TO 60%) POLYESTER RESIN | | | |
| | (b) CROSS-LINKING AGENT | DESMOTHERM 2170 (70% NONVOLATILE CONTENT) AROMATIC BLOCKED ISOCYANATE | 43 | 43 | 43 |
| | | DESMODUR BL3175 (75% NONVOLATILE CONTENT) ALIPHATIC BLOCKED ISOCYANATE | | | |
| | | MYCOAT 715 (80% NONVOLATILE CONTENT) MELAMINE RESIN | | | |
| | TOTAL OF RESIN AND CROSS-LINKING AGENT | | 100 | 100 | 100 |
| | (c) ALKALINE EARTH METAL VANADATE AND MAGNESIUM VANADATE | CALCIUM VANADATE | 51 | 60 | 60 |
| | | MAGNESIUM VANADATE | | | |
| | (d) TRIMAGNESIUM PHOSPHATE | SODIUM METAVANADATE | 25 | 25 | 25 |
| | | VANADIUM PENTOXIDE | | | |
| | OTHER ANTICORROSIVE PIGMENT | SHIELDEX C303 CALCIUM SILICATE | | | |
| | | MONOMAGNESIUM PHOSPHATE | | | |
| | | DIMAGNESIUM PHOSPHATE | | | |
| | | TRICALCIUM PHOSPHATE | | | |
| | (e) EXTENDER PIGMENT | PRECIPITATED BARIUM SULFATE B-55 BARIUM SULFATE | | | |
| | | NO. 1 CLAY HYDRATED ALUMINUM SILICATE | | | |
| | | UNIGLOSS 1000 CALCIUM CARBONATE | | | |
| | | TALC SSS HYDRATED MAGNESIUM SILICATE | | | |
| | | GASIL HP260 SILICA POWDER | | | |
| | (f) COUPLING AGENT | TORAY Z-6011 SILANE COUPLING AGENT | 5 | 5 | 5 |
| | COATING FILM CURING CATALYST | DBTL DIBUTYLTIN COMPOUND | 0.5 | 0.5 | 0.5 |
| | SOLVENT | CYCLOHEXANONE KETONE-BASED SOLVENT | 75 | 75 | 75 |
| | | SOLVESSO 150 AROMATIC HYDROCARBON | 75 | 75 | 75 |

TABLE 1-continued

| | | | EXAMPLE 4 | EXAMPLE 5 | EXAMPLE 6 |
|---|---|---|---|---|---|
| BASE MATERIAL | HOT-DIPPED STEEL MATERIAL | HOT-DIP 55% ALUMINUM-2% MAGNESIUM-1.6% SILICON-0.03% CHROMIUM-ZINC ALLOY PLATED STEEL SHEET | | | |
| | | HOT-DIP 55% ALUMINUM-0.5% MAGNESIUM-1.6% SILICON-0.03% CHROMIUM-ZINC ALLOY PLATED STEEL SHEET | | | |
| | | HOT-DIP 55% ALUMINUM-5% MAGNESIUM-1.6% SILICON-0.03% CHROMIUM-ZINC ALLOY PLATED STEEL SHEET | | | |
| | | HOT-DIP 55% ALUMINUM-11% MAGNESIUM-1.6% SILICON-0.03% CHROMIUM-ZINC ALLOY PLATED STEEL SHEET | | | |
| | | HOT-DIP 55% ALUMINUM-2% MAGNESIUM-1.6% SILICON-0.01% CHROMIUM-ZINC ALLOY PLATED STEEL SHEET | ○ | | |
| | | HOT-DIP 55% ALUMINUM-2% MAGNESIUM-1.6% SILICON-1.1% CHROMIUM-ZINC ALLOY PLATED STEEL SHEET | | ○ | |
| | | HOT-DIP 55% ALUMINUM-1.6% SILICON-ZINC ALLOY PLATED STEEL SHEET | | | ○ |
| | | HOT-DIP GALVANIZED STEEL SHEET | | | |
| COATING CONFIGURATION | PRETREATMENT | CHROMATE-FREE COATING PRETREATMENT | ○ | ○ | ○ |
| | (a) COATING FILM-FORMING RESIN | jER1007 (30% NONVOLATILE CONTENT) | 233 | 233 | 233 |
| | | VYLON GK780 (NONVOLATILE CONTENT ADJUSTED TO 60%) | | | |
| | | EPOXY RESIN | | | |
| | | POLYESTER RESIN | | | |
| | (b) CROSS-LINKING AGENT | DESMOTHERM 2170 (70% NONVOLATILE CONTENT) | 43 | 43 | 43 |
| | | DESMODUR BL3175 (75% NONVOLATILE CONTENT) | | | |
| | | MYCOAT 715 (80% NONVOLATILE CONTENT) | | | |
| | | AROMATIC BLOCKED ISOCYANATE | | | |
| | | ALIPHATIC BLOCKED ISOCYANATE | | | |
| | | MELAMINE RESIN | | | |
| | TOTAL OF RESIN AND CROSS-LINKING AGENT | | 100 | 100 | 100 |
| | (c) ALKALINE EARTH METAL VANADATE AND MAGNESIUM VANADATE | CALCIUM VANADATE | 60 | 100 | 150 |
| | | MAGNESIUM VANADATE | | | |
| | | SODIUM METAVANADATE | | | |
| | | VANADIUM PENTOXIDE | | | |
| | | SHIELDEX C303 | | | |
| | (d) TRIMAGNESIUM PHOSPHATE | MONOMAGNESIUM PHOSPHATE | | | |
| | OTHER ANTICORROSIVE PIGMENT | DIMAGNESIUM PHOSPHATE | | | |
| | | TRICALCIUM PHOSPHATE | | | |
| | | PRECIPITATED BARIUM SULFATE B-55 | 25 | 25 | 25 |
| | (e) EXTENDER PIGMENT | CALCIUM SILICATE | | | |
| | | BARIUM SULFATE | | | |
| | | HYDRATED ALUMINUM SILICATE | | | |
| | | NO. 1 CLAY | | | |
| | | CALCIUM CARBONATE | | | |
| | | UNIGLOSS 1000 | | | |
| | | HYDRATED MAGNESIUM SILICATE | | | |
| | | TALC SSS | | | |
| | | SILICA POWDER | | | |
| | | GASIL HP260 | | | |
| | (f) COUPLING AGENT | SILANE COUPLING AGENT | | | |
| | | TORAY Z-6011 | 5 | 5 | 5 |
| | COATING FILM CURING CATALYST | DIBUTYLTIN COMPOUND | | | |
| | | DBTL | 0.5 | 0.5 | 0.5 |
| | SOLVENT | KETONE-BASED SOLVENT | | | |
| | | CYCLOHEXANONE | 75 | 75 | 75 |
| | | AROMATIC HYDROCARBON | | | |
| | | SOLVESSO 150 | 75 | 75 | 75 |

TABLE 1-continued

| | | | EXAMPLE 7 | EXAMPLE 8 | EXAMPLE 9 |
|---|---|---|---|---|---|
| BASE MATERIAL | | HOT-DIPPED STEEL MATERIAL | HOT-DIP 55% ALUMINUM-2% MAGNESIUM-1.6% SILICON-0.03% CHROMIUM-ZINC ALLOY PLATED STEEL SHEET | ○ | ○ | ○ |
| | | | HOT-DIP 55% ALUMINUM-0.5% MAGNESIUM-1.6% SILICON-0.03% CHROMIUM-ZINC ALLOY PLATED STEEL SHEET | | | |
| | | | HOT-DIP 55% ALUMINUM-5% MAGNESIUM-1.6% SILICON-0.03% CHROMIUM-ZINC ALLOY PLATED STEEL SHEET | | | |
| | | | HOT-DIP 55% ALUMINUM-11% MAGNESIUM-1.6% SILICON-0.03% CHROMIUM-ZINC ALLOY PLATED STEEL SHEET | | | |
| | | | HOT-DIP 55% ALUMINUM-2% MAGNESIUM-1.6% SILICON-0.01% CHROMIUM-ZINC ALLOY PLATED STEEL SHEET | | | |
| | | | HOT-DIP 55% ALUMINUM-2% MAGNESIUM-1.6% SILICON-1.1% CHROMIUM-ZINC ALLOY PLATED STEEL SHEET | | | |
| | | | HOT-DIP 55% ALUMINUM-1.6% SILICON-ZINC ALLOY PLATED STEEL SHEET | | | |
| | | | HOT-DIP GALVANIZED STEEL SHEET | | | |
| COATING CONFIGURATION | | PRETREATMENT | CHROMATE-FREE COATING PRETREATMENT | ○ | ○ | ○ |
| | (a) | COATING FILM-FORMING RESIN | jER1007 (30% NONVOLATILE CONTENT) | | | |
| | | | VYLON GK780 (NONVOLATILE CONTENT ADJUSTED TO 60%) | 233 | 233 | 233 |
| | | | EPOXY RESIN | | | |
| | | | POLYESTER RESIN | | | |
| | (b) | CROSS-LINKING AGENT | DESMOTHERM 2170 (70% NONVOLATILE CONTENT) | 43 | 43 | 43 |
| | | | DESMODUR BL3175 (75% NONVOLATILE CONTENT) | | | |
| | | | MYCOAT 715 (80% NONVOLATILE CONTENT) | | | |
| | | | AROMATIC BLOCKED ISOCYANATE | | | |
| | | | ALIPHATIC BLOCKED ISOCYANATE | | | |
| | | | MELAMINE RESIN | | | |
| | | TOTAL OF RESIN AND CROSS-LINKING AGENT | | 100 | 100 | 100 |
| | (c) | ALKALINE EARTH METAL VANADATE AND MAGNESIUM VANADATE | CALCIUM VANADATE | 60 | 60 | 60 |
| | | | MAGNESIUM VANADATE | | | |
| | (d) | TRIMAGNESIUM PHOSPHATE | SODIUM METAVANADATE | 25 | 3 | 50 |
| | | OTHER ANTICORROSIVE PIGMENT | VANADIUM PENTOXIDE | | | |
| | | | SHIELDEX C303 | | | |
| | | | MONOMAGNESIUM PHOSPHATE | | | |
| | | | DIMAGNESIUM PHOSPHATE | | | |
| | | | TRICALCIUM PHOSPHATE | | | |
| | | | CALCIUM SILICATE | | | |
| | (e) | EXTENDER PIGMENT | PRECIPITATED BARIUM SULFATE B-55 | | | |
| | | | BARIUM SULFATE | | | |
| | | | NO. 1 CLAY | | | |
| | | | HYDRATED ALUMINUM SILICATE | | | |
| | | | UNIGLOSS 1000 | | | |
| | | | CALCIUM CARBONATE | | | |
| | | | TALC SSS | | | |
| | | | HYDRATED MAGNESIUM SILICATE | | | |
| | | | GASIL HP260 | | | |
| | | | SILICA POWDER | | | |
| | (f) | COUPLING AGENT | TORAY Z-6011 | 5 | 5 | 5 |
| | | | SILANE COUPLING AGENT | | | |
| | | COATING FILM CURING CATALYST | DBTL | 0.5 | 0.5 | 0.5 |
| | | | DIBUTYLTIN COMPOUND | | | |
| | | SOLVENT | CYCLOHEXANONE | 75 | 75 | 75 |
| | | | KETONE-BASED SOLVENT | | | |
| | | | SOLVESSO 150 | 75 | 75 | 75 |
| | | | AROMATIC HYDROCARBON | | | |

TABLE 2

|  |  |  | EXAMPLE 10 | EXAMPLE 11 | EXAMPLE 12 |
|---|---|---|---|---|---|
| BASE MATERIAL | HOT-DIPPED STEEL MATERIAL | HOT-DIP 55% ALUMINUM-2% MAGNESIUM-1.6% SILICON-0.03% CHROMIUM-ZINC ALLOY PLATED STEEL SHEET | ○ | ○ | ○ |
|  |  | HOT-DIP 55% ALUMINUM-0.5% MAGNESIUM-1.6% SILICON-0.03% CHROMIUM-ZINC ALLOY PLATED STEEL SHEET |  |  |  |
|  |  | HOT-DIP 55% ALUMINUM-5% MAGNESIUM-1.6% SILICON-0.03% CHROMIUM-ZINC ALLOY PLATED STEEL SHEET |  |  |  |
|  |  | HOT-DIP 55% ALUMINUM-11% MAGNESIUM-1.6% SILICON-0.03% CHROMIUM-ZINC ALLOY PLATED STEEL SHEET |  |  |  |
|  |  | HOT-DIP 55% ALUMINUM-2% MAGNESIUM-1.6% SILICON-0.01% CHROMIUM-ZINC ALLOY PLATED STEEL SHEET |  |  |  |
|  |  | HOT-DIP 55% ALUMINUM-2% MAGNESIUM-1.6% SILICON-1.1% CHROMIUM-ZINC ALLOY PLATED STEEL SHEET |  |  |  |
|  |  | HOT-DIP GALVANIZED STEEL SHEET |  |  |  |
| COATING CONFIGURATION |  | PRETREATMENT | CHROMATE-FREE COATING PRETREATMENT | ○ | ○ | ○ |
|  | (a) | COATING FILM-FORMING RESIN | jER1007 (30% NONVOLATILE CONTENT) EPOXY RESIN | 233 | 117 | 233 |
|  |  |  | VYLON GK780 (NONVOLATILE CONTENT ADJUSTED TO 60%) POLYESTER RESIN |  |  |  |
|  | (b) | CROSS-LINKING AGENT | DESMOTHERM 2170 (70% NONVOLATILE CONTENT) AROMATIC BLOCKED ISOCYANATE | 43 | 43 |  |
|  |  |  | DESMODUR BL3175 (75% NONVOLATILE CONTENT) ALIPHATIC BLOCKED ISOCYANATE |  |  | 40 |
|  |  |  | MYCOAT 715 (80% NONVOLATILE CONTENT) MELAMINE RESIN |  |  |  |
|  |  | TOTAL OF RESIN AND CROSS-LINKING AGENT |  | 100 | 100 | 100 |
|  | (c) | ALKALINE EARTH METAL VANADATE AND MAGNESIUM VANADATE | CALCIUM VANADATE | 60 | 60 | 60 |
|  |  |  | MAGNESIUM VANADATE |  |  |  |
|  | (d) | TRIMAGNESIUM PHOSPHATE | SODIUM METAVANADATE | 150 | 25 | 25 |
|  |  | OTHER ANTICORROSIVE PIGMENT | VANADIUM PENTOXIDE |  |  |  |
|  |  |  | SHIELDEX C303 CALCIUM SILICATE |  |  |  |
|  |  |  | MONOMAGNESIUM PHOSPHATE |  |  |  |
|  |  |  | DIMAGNESIUM PHOSPHATE |  |  |  |
|  |  |  | TRICALCIUM PHOSPHATE |  |  |  |
|  | (e) | EXTENDER PIGMENT | PRECIPITATED BARIUM SULFATE B-55 BARIUM SULFATE |  |  |  |
|  |  |  | NO. 1 CLAY HYDRATED ALUMINUM SILICATE |  |  |  |
|  |  |  | UNIGLOSS 1000 CALCIUM CARBONATE |  |  |  |
|  |  |  | TALC SSS HYDRATED MAGNESIUM SILICATE |  |  |  |
|  |  |  | GASIL HP260 SILICA POWDER |  |  |  |
|  | (f) | COUPLING AGENT | TORAY Z-6011 SILANE COUPLING AGENT | 5 | 5 | 5 |
|  |  | COATING FILM CURING CATALYST | DBTL DIBUTYLTIN COMPOUND | 0.5 | 0.5 | 0.5 |
|  |  | SOLVENT | CYCLOHEXANONE KETONE-BASED SOLVENT | 75 | 75 | 75 |
|  |  |  | SOLVESSO 150 AROMATIC HYDROCARBON | 75 | 75 | 75 |

TABLE 2-continued

| | | | EXAMPLE 13 | EXAMPLE 14 | EXAMPLE 15 |
|---|---|---|---|---|---|
| BASE MATERIAL | HOT-DIPPED STEEL MATERIAL | HOT-DIP 55% ALUMINUM-2% MAGNESIUM-1.6% SILICON-0.03% CHROMIUM-ZINC ALLOY PLATED STEEL SHEET | ◯ | | |
| | | HOT-DIP 55% ALUMINUM-0.5% MAGNESIUM-1.6% SILICON-0.03% CHROMIUM-ZINC ALLOY PLATED STEEL SHEET | | | |
| | | HOT-DIP 55% ALUMINUM-5% MAGNESIUM-1.6% SILICON-0.03% CHROMIUM-ZINC ALLOY PLATED STEEL SHEET | | | |
| | | HOT-DIP 55% ALUMINUM-11% MAGNESIUM-1.6% SILICON-0.03% CHROMIUM-ZINC ALLOY PLATED STEEL SHEET | | | |
| | | HOT-DIP 55% ALUMINUM-2% MAGNESIUM-1.6% SILICON-0.01% CHROMIUM-ZINC ALLOY PLATED STEEL SHEET | | | |
| | | HOT-DIP 55% ALUMINUM-2% MAGNESIUM-1.6% SILICON-1.1% CHROMIUM-ZINC ALLOY PLATED STEEL SHEET | | ◯ | ◯ |
| | | HOT-DIP 55% ALUMINUM-1.6% SILICON-ZINC ALLOY PLATED STEEL SHEET | | | |
| | | HOT-DIP GALVANIZED STEEL SHEET | | | |
| COATING CONFIGURATION | (a) PRETREATMENT | CHROMATE-FREE COATING PRETREATMENT | ◯ | ◯ | ◯ |
| | COATING FILM-FORMING RESIN | jER1007 (30% NONVOLATILE CONTENT) EPOXY RESIN | 233 | 233 | 233 |
| | | VYLON GK780 (NONVOLATILE CONTENT ADJUSTED TO 60%) POLYESTER RESIN | | | |
| | (b) CROSS-LINKING AGENT | DESMOTHERM 2170 (70% NONVOLATILE CONTENT) AROMATIC BLOCKED ISOCYANATE | | | |
| | | DESMODUR BL3175 (75% NONVOLATILE CONTENT) ALIPHATIC BLOCKED ISOCYANATE | | 43 | 43 |
| | | MYCOAT 715 (80% NONVOLATILE CONTENT) MELAMINE RESIN | 38 | | |
| | TOTAL OF RESIN AND CROSS-LINKING AGENT | | 100 | 100 | 100 |
| | (c) ALKALINE EARTH METAL VANADATE AND MAGNESIUM VANADATE | CALCIUM VANADATE | 60 | 60 | 60 |
| | | MAGNESIUM VANADATE | | | |
| | (d) TRIMAGNESIUM PHOSPHATE | | 25 | 25 | 25 |
| | OTHER ANTICORROSIVE PIGMENT | SODIUM METAVANADATE | | | |
| | | VANADIUM PENTOXIDE | | | |
| | | SHIELDEX C303 CALCIUM SILICATE | | | |
| | | MONOMAGNESIUM PHOSPHATE | | | |
| | | DIMAGNESIUM PHOSPHATE | | | |
| | | TRICALCIUM PHOSPHATE | | | |
| | (e) EXTENDER PIGMENT | PRECIPITATED BARIUM SULFATE B-55 BARIUM SULFATE | | | |
| | | NO. 1 CLAY HYDRATED ALUMINUM SILICATE | | 40 | 40 |
| | | UNIGLOSS 1000 CALCIUM CARBONATE | | | |
| | | TALC SSS HYDRATED MAGNESIUM SILICATE | | | |
| | | GASIL HP260 SILICA POWDER | 5 | 5 | 5 |
| | (f) COUPLING AGENT | TORAY Z-6011 SILANE COUPLING AGENT | — | 0.5 | 0.5 |
| | COATING FILM CURING CATALYST | DBTL DIBUTYLTIN COMPOUND | 75 | 75 | 75 |
| | SOLVENT | CYCLOHEXANONE KETONE-BASED SOLVENT | 75 | 75 | 75 |
| | | SOLVESSO 150 AROMATIC HYDROCARBON | | | |

TABLE 2-continued

| | | | EXAMPLE 16 | EXAMPLE 17 | EXAMPLE 18 |
|---|---|---|---|---|---|
| BASE MATERIAL | HOT-DIPPED STEEL MATERIAL | HOT-DIP 55% ALUMINUM-2% MAGNESIUM-1.6% SILICON-0.03% CHROMIUM-ZINC ALLOY PLATED STEEL SHEET | ○ | | |
| | | HOT-DIP 55% ALUMINUM-0.5% MAGNESIUM-1.6% SILICON-0.03% CHROMIUM-ZINC ALLOY PLATED STEEL SHEET | | | |
| | | HOT-DIP 55% ALUMINUM-5% MAGNESIUM-1.6% SILICON-0.03% CHROMIUM-ZINC ALLOY PLATED STEEL SHEET | | | |
| | | HOT-DIP 55% ALUMINUM-11% MAGNESIUM-1.6% SILICON-0.03% CHROMIUM-ZINC ALLOY PLATED STEEL SHEET | | | |
| | | HOT-DIP 55% ALUMINUM-2% MAGNESIUM-1.6% SILICON-0.01% CHROMIUM-ZINC ALLOY PLATED STEEL SHEET | | ○ | |
| | | HOT-DIP 55% ALUMINUM-2% MAGNESIUM-1.6% SILICON-1.1% CHROMIUM-ZINC ALLOY PLATED STEEL SHEET | | | ○ |
| | | HOT-DIP 55% ALUMINUM-1.6% SILICON-ZINC ALLOY PLATED STEEL SHEET | | | |
| | | HOT-DIP GALVANIZED STEEL SHEET | | | |
| COATING CONFIGURATION | PRETREATMENT | CHROMATE-FREE COATING PRETREATMENT | | | |
| | (a) COATING FILM-FORMING RESIN | jER1007 (30% NONVOLATILE CONTENT) EPOXY RESIN | 233 | 233 | 233 |
| | | VYLON GK780 (NONVOLATILE CONTENT ADJUSTED TO 60%) POLYESTER RESIN | | | |
| | (b) CROSS-LINKING AGENT | DESMOTHERM 2170 (70% NONVOLATILE CONTENT) AROMATIC BLOCKED ISOCYANATE | 43 | 43 | 43 |
| | | DESMODUR BL3175 (75% NONVOLATILE CONTENT) ALIPHATIC BLOCKED ISOCYANATE | | | |
| | | MYCOAT 715 (80% NONVOLATILE CONTENT) MELAMINE RESIN | | | |
| | TOTAL OF RESIN AND CROSS-LINKING AGENT | | 100 | 100 | 100 |
| | (c) ALKALINE EARTH METAL VANADATE AND MAGNESIUM VANADATE | CALCIUM VANADATE | 60 | 60 | 60 |
| | | MAGNESIUM VANADATE | | | |
| | (d) TRIMAGNESIUM PHOSPHATE | | 25 | 25 | 25 |
| | OTHER ANTICORROSIVE PIGMENT | SODIUM METAVANADATE | | | |
| | | VANADIUM PENTOXIDE | | | |
| | | SHIELDEX C303 CALCIUM SILICATE | | | |
| | | MONOMAGNESIUM PHOSPHATE | | | |
| | | DIMAGNESIUM PHOSPHATE | | | |
| | | TRICALCIUM PHOSPHATE | | | |
| | (e) EXTENDER PIGMENT | PRECIPITATED BARIUM SULFATE B-55 BARIUM SULFATE | 30 | | |
| | | NO. 1 CLAY HYDRATED ALUMINUM SILICATE | | 30 | |
| | | UNIGLOSS 1000 CALCIUM CARBONATE | | | |
| | | TALC SSS HYDRATED MAGNESIUM SILICATE | | | 30 |
| | | GASIL HP260 SILICA POWDER | | | |
| | (f) COUPLING AGENT | TORAY Z-6011 SILANE COUPLING AGENT | 5 | 5 | 5 |
| | COATING FILM CURING CATALYST | DBTL DIBUTYLTIN COMPOUND | 0.5 | 0.5 | 0.5 |
| | SOLVENT | CYCLOHEXANONE KETONE-BASED SOLVENT | 75 | 75 | 75 |
| | | SOLVESSO 150 AROMATIC HYDROCARBON | 75 | 75 | 75 |

TABLE 3

| | | | COMPARATIVE EXAMPLE 1 | COMPARATIVE EXAMPLE 2 | COMPARATIVE EXAMPLE 3 |
|---|---|---|---|---|---|
| BASE MATERIAL | HOT-DIPPED STEEL MATERIAL | HOT-DIP 55% ALUMINUM-2% MAGNESIUM-1.6% SILICON-0.03% CHROMIUM-ZINC ALLOY PLATED STEEL SHEET | | | |
| | | HOT-DIP 55% ALUMINUM-0.5% MAGNESIUM-1.6% SILICON-0.03% CHROMIUM-ZINC ALLOY PLATED STEEL SHEET | | | |
| | | HOT-DIP 55% ALUMINUM-5% MAGNESIUM-1.6% SILICON-0.03% CHROMIUM-ZINC ALLOY PLATED STEEL SHEET | | | |
| | | HOT-DIP 55% ALUMINUM-11% SILICON-0.03% CHROMIUM-ZINC ALLOY PLATED STEEL SHEET | | | |
| | | HOT-DIP 55% ALUMINUM-2% MAGNESIUM-1.6% SILICON-0.01% CHROMIUM-ZINC ALLOY PLATED STEEL SHEET | | | |
| | | HOT-DIP 55% ALUMINUM-2% MAGNESIUM-1.6% SILICON-1.1% CHROMIUM-ZINC ALLOY PLATED STEEL SHEET | | | |
| | | HOT-DIP GALVANIZED STEEL SHEET | ○ | ○ | ○○ |
| | PRETREATMENT | CHROMATE-FREE COATING PRETREATMENT | ○ | ○ | ○ |
| COATING CONFIGURATION | (a) COATING FILM-FORMING RESIN | jER1007 (30% NONVOLATILE CONTENT) EPOXY RESIN | 233 | 233 | 233 |
| | | VYLON GK780 POLYESTER RESIN (NONVOLATILE CONTENT ADJUSTED TO 60%) | | | |
| | (b) CROSS-LINKING AGENT | DESMOTHERM 2170 (70% NONVOLATILE CONTENT) AROMATIC BLOCKED ISOCYANATE | 43 | 43 | 43 |
| | | DESMODUR BL3175 (75% NONVOLATILE CONTENT) ALIPHATIC BLOCKED ISOCYANATE | | | |
| | | MYCOAT 715 (80% NONVOLATILE CONTENT) MELAMINE RESIN | | | |
| | TOTAL OF RESIN AND CROSS-LINKING AGENT | | 100 | 100 | 100 |
| | (c) ALKALINE EARTH METAL VANADATE AND MAGNESIUM VANADATE | CALCIUM VANADATE | 60 | 60 | 60 |
| | | MAGNESIUM VANADATE | | | |
| | (d) TRIMAGNESIUM PHOSPHATE | | 25 | 25 | 25 |
| | OTHER ANTICORROSIVE PIGMENT | SODIUM METAVANADATE | | | |
| | | VANADIUM PENTOXIDE | | | |
| | | SHIELDEX C303 CALCIUM SILICATE | | | |
| | | MONOMAGNESIUM PHOSPHATE | | | |
| | | DIMAGNESIUM PHOSPHATE | | | |
| | | TRICALCIUM PHOSPHATE | | | |
| | | STRONTIUM CHROMATE | | | |
| | (e) EXTENDER PIGMENT | PRECIPITATED BARIUM SULFATE B-55 BARIUM SULFATE | | | |
| | | NO. 1 CLAY HYDRATED ALUMINUM SILICATE | | | |
| | | UNIGLOSS 1000 CALCIUM CARBONATE | | | |
| | | TALC SSS HYDRATED MAGNESIUM SILICATE | | | |
| | | GASIL HP260 SILICA POWDER | | | |
| | (f) COUPLING AGENT | TORAY Z-6011 SILANE COUPLNG AGENT | 5 | 5 | 5 |
| | COATING FILM CURING CATALYST | DBTL DIBUTYLTIN COMPOUND | 0.5 | 0.5 | 0.5 |
| | SOLVENT | CYCLOHEXANONE KETONE-BASED SOLVENT | 75 | 75 | 75 |

TABLE 3-continued

|  |  |  | COMPARATIVE EXAMPLE 4 | COMPARATIVE EXAMPLE 5 | COMPARATIVE EXAMPLE 6 |
|---|---|---|---|---|---|
| BASE MATERIAL | HOT-DIPPED STEEL MATERIAL | HOT-DIP 55% ALUMINUM-2% MAGNESIUM-1.6% SILICON-ZINC ALLOY PLATED STEEL SHEET | 75 | 75 | 75 |
|  |  | HOT-DIP 55% ALUMINUM-0.03% CHROMIUM-ZINC ALLOY PLATED STEEL SHEET |  |  |  |
|  |  | HOT-DIP 55% ALUMINUM-0.5% MAGNESIUM-1.6% SILICON-0.03% CHROMIUM-ZINC ALLOY PLATED STEEL SHEET |  |  |  |
|  |  | HOT-DIP 55% ALUMINUM-2% MAGNESIUM-1.6% SILICON-0.03% CHROMIUM-ZINC ALLOY PLATED STEEL SHEET |  |  |  |
|  |  | HOT-DIP 55% ALUMINUM-5% MAGNESIUM-1.6% SILICON-0.03% CHROMIUM-ZINC ALLOY PLATED STEEL SHEET |  |  |  |
|  |  | HOT-DIP 55% ALUMINUM-11% MAGNESIUM-1.6% SILICON-0.03% CHROMIUM-ZINC ALLOY PLATED STEEL SHEET |  |  |  |
|  |  | HOT-DIP 55% ALUMINUM-2% MAGNESIUM-1.6% SILICON-0.01% CHROMIUM-ZINC ALLOY PLATED STEEL SHEET |  |  |  |
|  |  | HOT-DIP 55% ALUMINUM-2% MAGNESIUM-1.6% SILICON-1.1% CHROMIUM-1.6% SILICON-ZINC ALLOY PLATED STEEL SHEET |  |  |  |
|  |  | HOT-DIP GALVANIZED STEEL SHEET |  |  |  |
| COATING CONFIGURATION | PRETREATMENT | CHROMATE-FREE COATING PRETREATMENT | ○ | ○ | ○ |
|  | (a) COATING FILM-FORMING RESIN | jER1007 (30% NONVOLATILE CONTENT) EPOXY RESIN | 233 | 233 | 233 |
|  |  | VYLON GK780 POLYESTER RESIN (NONVOLATILE CONTENT ADJUSTED TO 60%) |  |  |  |
|  | (b) CROSS-LINKING AGENT | DESMOTHERM 2170 (70% NONVOLATILE CONTENT) AROMATIC BLOCKED ISOCYANATE | 43 | 43 | 43 |
|  |  | DESMODUR BL3175 (75% NONVOLATILE CONTENT) ALIPHATIC BLOCKED ISOCYANATE |  |  |  |
|  |  | MYCOAT 715 (80% NONVOLATILE CONTENT) MELAMINE RESIN |  |  |  |
|  | TOTAL OF RESIN AND CROSS-LINKING AGENT |  | 100 | 100 | 100 |
|  | (c) ALKALINE EARTH METAL VANADATE AND MAGNESIUM VANADATE | CALCIUM VANADATE | 20 | 180 | 60 |
|  |  | MAGNESIUM VANADATE |  |  |  |
|  | (d) TRIMAGNESIUM PHOSPHATE |  | 25 | 25 | 0 |
|  | OTHER ANTICORROSIVE PIGMENT | SODIUM METAVANADATE |  |  |  |
|  |  | VANADIUM PENTOXIDE |  |  |  |
|  |  | SHIELDEX C303 CALCIUM SILICATE |  |  |  |
|  |  | MONOMAGNESIUM PHOSPHATE |  |  |  |
|  |  | DIMAGNESIUM PHOSPHATE |  |  |  |
|  |  | TRICALCIUM PHOSPHATE |  |  |  |
|  |  | STRONTIUM CHROMATE |  |  |  |
|  | (e) EXTENDER PIGMENT | PRECIPITATED BARIUM SULFATE B-55 BARIUM SULFATE |  |  |  |
|  |  | NO. 1 CLAY HYDRATED ALUMINUM SILICATE |  |  |  |
|  |  | UNIGLOSS 1000 CALCIUM CARBONATE |  |  |  |
|  |  | TALC SSS HYDRATED MAGNESIUM SILICATE |  |  |  |
|  |  | GASIL HP260 SILICA POWDER |  |  |  |
|  | (f) COUPLING AGENT | TORAY Z-6011 SILANE COUPLING AGENT | 5 | 5 | 5 |
|  | COATING FILM CURING CATALYST | DBTL DIBUTYLTIN COMPOUND | 0.5 | 0.5 | 0.5 |
|  | SOLVENT | CYCLOHEXANONE KETONE-BASED SOLVENT | 75 | 75 | 75 |
|  |  | SOLVESSO 150 AROMATIC HYDROCARBON |  |  |  |

TABLE 3-continued

| BASE MATERIAL | | HOT-DIPPED STEEL MATERIAL | | | COMPARATIVE EXAMPLE 7 | COMPARATIVE EXAMPLE 8 |
|---|---|---|---|---|---|---|
| | | | | HOT-DIP 55% ALUMINUM-2% MAGNESIUM-1.6% SILICON-0.03% CHROMIUM-ZINC ALLOY PLATED STEEL SHEET | 75 | 75 |
| | | | | HOT-DIP 55% ALUMINUM-0.5% MAGNESIUM-1.6% SILICON-0.03% CHROMIUM-ZINC ALLOY PLATED STEEL SHEET | | |
| | | | | HOT-DIP 55% ALUMINUM-5% MAGNESIUM-1.6% SILICON-0.03% CHROMIUM-ZINC ALLOY PLATED STEEL SHEET | | |
| | | | | HOT-DIP 55% ALUMINUM-11% MAGNESIUM-1.6% SILICON-0.03% CHROMIUM-ZINC ALLOY PLATED STEEL SHEET | | |
| | | | | HOT-DIP 55% ALUMINUM-2% MAGNESIUM-0.01% SILICON-0.03% CHROMIUM-ZINC ALLOY PLATED STEEL SHEET | | |
| | | | | HOT-DIP 55% ALUMINUM-2% MAGNESIUM-1.6% SILICON-1.1% CHROMIUM-ZINC ALLOY PLATED STEEL SHEET | | |
| | | | | HOT-DIP 55% ALUMINUM-1.6% SILICON-ZINC ALLOY PLATED STEEL SHEET | | |
| | | | | HOT-DIP GALVANIZED STEEL SHEET | | |
| COATING CONFIGURATION | | PRETREATMENT | | CHROMATE-FREE COATING PRETREATMENT | ○ | ○ |
| | (a) | COATING FILM-FORMING RESIN | | jER1007 (30% NONVOLATILE CONTENT) | | |
| | | | | VYLON GK780 (NONVOLATILE CONTENT ADJUSTED TO 60%) | EPOXY RESIN | 233 | 233 |
| | | | | | POLYESTER RESIN | | |
| | (b) | CROSS-LINKING AGENT | | DESMOTHERM 2170 (70% NONVOLATILE CONTENT) | AROMATIC BLOCKED ISOCYANATE | 43 | 43 |
| | | | | DESMODUR BL3175 (75% NONVOLATILE CONTENT) | ALIPHATIC BLOCKED ISOCYANATE | | |
| | | | | MYCOAT 715 (80% NONVOLATILE CONTENT) | MELAMINE RESIN | | |
| | | TOTAL OF RESIN AND CROSS-LINKING AGENT | | | | 100 | 100 |
| | (c) | ALKALINE EARTH METAL VANADATE AND MAGNESIUM VANADATE | | CALCIUM VANADATE | | 60 | |
| | | | | MAGNESIUM VANADATE | | | |
| | (d) | TRIMAGNESIUM PHOSPHATE | | SODIUM METAVANADATE | | 1 | 25 |
| | | OTHER ANTICORROSIVE PIGMENT | | VANADIUM PENTOXIDE | | | 60 |
| | | | | SHIELDEX C303 | | | |
| | | | | MONOMAGNESIUM PHOSPHATE | | | |
| | | | | DIMAGNESIUM PHOSPHATE | | | |
| | | | | TRICALCIUM PHOSPHATE | CALCIUM SILICATE | | |
| | | | | STRONTIUM CHROMATE | | | |
| | (e) | EXTENDER PIGMENT | | PRECIPITATED BARIUM SULFATE B-55 | BARIUM SULFATE | | |
| | | | | NO. 1 CLAY | HYDRATED ALUMINUM SILICATE | | |
| | | | | UNIGLOSS 1000 | CALCIUM CARBONATE | | |
| | | | | TALC SSS | HYDRATED MAGNESIUM SILICATE | | |
| | | | | GASIL HP260 | SILICA POWDER | | |
| | (f) | COUPLING AGENT | | TORAY Z-6011 | SILANE COUPLING AGENT | 5 | 5 |
| | | COATING FILM CURING CATALYST | | DBTL | DIBUTYLTIN COMPOUND | 0.5 | 0.5 |
| | | SOLVENT | | CYCLOHEXANONE | KETONE-BASED SOLVENT | 75 | 75 |
| | | | | SOLVESSO 150 | AROMATIC HYDROCARBON | 75 | 75 |

TABLE 4

| | | | | COMPARATIVE EXAMPLE 9 | COMPARATIVE EXAMPLE 10 | COMPARATIVE EXAMPLE 11 |
|---|---|---|---|---|---|---|
| BASE MATERIAL | HOT-DIPPED STEEL MATERIAL | | HOT-DIP 55% ALUMINUM-2% MAGNESIUM-1.6% SILICON-0.03% CHROMIUM-ZINC ALLOY PLATED STEEL SHEET | ○ | | |
| | | | HOT-DIP 55% ALUMINUM-0.5% MAGNESIUM-1.6% SILICON-0.03% CHROMIUM-ZINC ALLOY PLATED STEEL SHEET | | | |
| | | | HOT-DIP 55% ALUMINUM-5% MAGNESIUM-1.6% SILICON-0.03% CHROMIUM-ZINC ALLOY PLATED STEEL SHEET | | | |
| | | | HOT-DIP 55% ALUMINUM-11% MAGNESIUM-1.6% SILICON-0.03% CHROMIUM-ZINC ALLOY PLATED STEEL SHEET | | | |
| | | | HOT-DIP 55% ALUMINUM-2% MAGNESIUM-1.6% SILICON-0.01% CHROMIUM-ZINC ALLOY PLATED STEEL SHEET | | | |
| | | | HOT-DIP 55% ALUMINUM-2% MAGNESIUM-1.6% SILICON-1.1% CHROMIUM-ZINC ALLOY PLATED STEEL SHEET | | | |
| | | | HOT-DIP 55% ALUMINUM-1.6% SILICON-ZINC ALLOY PLATED STEEL SHEET | | ○ | |
| | | | HOT-DIP GALVANIZED STEEL SHEET | | | ○ |
| COATING CONFIGURATION | PRETREATMENT | | CHROMATE-FREE COATING PRETREATMENT | | | |
| | (a) COATING FILM-FORMING RESIN | | jER1007 (30% NONVOLATILE CONTENT) EPOXY RESIN | | | |
| | | | VYLON GK780 (NONVOLATILE CONTENT ADJUSTED TO 60%) POLYESTER RESIN | 233 | 233 | 233 |
| | (b) CROSS-LINKING AGENT | | DESMOTHERM 2170 (70% NONVOLATILE CONTENT) AROMATIC BLOCKED ISOCYANATE | 43 | 43 | 43 |
| | | | DESMODUR BL3175 (75% NONVOLATILE CONTENT) ALIPHATIC BLOCKED ISOCYANATE | | | |
| | | | MYCOAT 715 (80% NONVOLATILE CONTENT) MELAMINE RESIN | | | |
| | TOTAL OF RESIN AND CROSS-LINKING AGENT | | | 100 | 100 | 100 |
| | (c) ALKALINE EARTH METAL VANADATE AND MAGNESIUM VANADATE | | CALCIUM VANADATE | 25 | 25 | |
| | | | MAGNESIUM VANADATE | | | |
| | (d) TRIMAGNESIUM PHOSPHATE | | | 60 | 60 | |
| | OTHER ANTICORROSIVE PIGMENT | | SODIUM METAVANADATE | | | |
| | | | VANADIUM PENTOXIDE | | | |
| | | | SHIELDEX C303 CALCIUM SILICATE | | | 25 |
| | | | MONOMAGNESIUM PHOSPHATE | | | |
| | | | DIMAGNESIUM PHOSPHATE | | | |
| | | | TRICALCIUM PHOSPHATE | | | |
| | | | STRONTIUM CHROMATE | | | |
| | (e) EXTENDER PIGMENT | | PRECIPITATED BARIUM SULFATE B-55 BARIUM SULFATE | | | |
| | | | NO. 1 CLAY HYDRATED ALUMINUM SILICATE | | | |
| | | | UNIGLOSS 1000 CALCIUM CARBONATE | | | |
| | | | TALC SSS HYDRATED MAGNESIUM SILICATE | | | |
| | | | GASIL HP260 SILICA POWDER | | | |
| | (f) COUPLING AGENT | | TORAY Z-6011 SILANE COUPLING AGENT | 5 | 5 | 5 |
| | COATING FILM CURING CATALYST | | DBTL DIBUTYLTIN COMPOUND | 0.5 | 0.5 | 0.5 |
| | SOLVENT | | CYCLOHEXANONE KETONE-BASED SOLVENT | 75 | 75 | 75 |
| | | | SOLVESSO 150 AROMATIC HYDROCARBON | 75 | 75 | 75 |

TABLE 4-continued

| | | | COMPARATIVE EXAMPLE 12 | COMPARATIVE EXAMPLE 13 | COMPARATIVE EXAMPLE 14 |
|---|---|---|---|---|---|
| BASE MATERIAL | HOT-DIPPED STEEL MATERIAL | HOT-DIP 55% ALUMINUM-2% MAGNESIUM-1.6% SILICON-0.03% CHROMIUM-ZINC ALLOY PLATED STEEL SHEET | | | |
| | | HOT-DIP 55% ALUMINUM-0.5% MAGNESIUM-1.6% SILICON-0.03% CHROMIUM-ZINC ALLOY PLATED STEEL SHEET | | | |
| | | HOT-DIP 55% ALUMINUM-5% MAGNESIUM-1.6% SILICON-0.03% CHROMIUM-ZINC ALLOY PLATED STEEL SHEET | | | |
| | | HOT-DIP 55% ALUMINUM-11% MAGNESIUM-1.6% SILICON-0.03% CHROMIUM-ZINC ALLOY PLATED STEEL SHEET | | | |
| | | HOT-DIP 55% ALUMINUM-2% MAGNESIUM-1.6% SILICON-0.01% CHROMIUM-ZINC ALLOY PLATED STEEL SHEET | | | |
| | | HOT-DIP 55% ALUMINUM-2% MAGNESIUM-1.6% SILICON-1.1% CHROMIUM-ZINC ALLOY PLATED STEEL SHEET | | | |
| | | HOT-DIP 55% ALUMINUM-1.6% SILICON-ZINC ALLOY PLATED STEEL SHEET | | ○ | ○ |
| | | HOT-DIP GALVANIZED STEEL SHEET | | | |
| | PRETREATMENT | CHROMATE-FREE COATING PRETREATMENT | ○ | ○ | ○ |
| COATING CONFIGURATION | (a) COATING FILM-FORMING RESIN | jER1007 (30% NONVOLATILE CONTENT) EPOXY RESIN | 233 | 233 | 233 |
| | | VYLON GK780 (NONVOLATILE CONTENT ADJUSTED TO 60%) POLYESTER RESIN | | | |
| | (b) CROSS-LINKING AGENT | DESMOTHERM 2170 (70% NONVOLATILE CONTENT) AROMATIC BLOCKED ISOCYANATE | 43 | 43 | 43 |
| | | DESMODUR BL3175 (75% NONVOLATILE CONTENT) ALIPHATIC BLOCKED ISOCYANATE | | | |
| | | MYCOAT 715 (80% NONVOLATILE CONTENT) MELAMINE RESIN | | | |
| | TOTAL OF RESIN AND CROSS-LINKING AGENT | | 100 | 100 | 100 |
| | (c) ALKALINE EARTH METAL VANADATE AND MAGNESIUM VANADATE | CALCIUM VANADATE | | | 60 |
| | | MAGNESIUM VANADATE | | | |
| | (d) TRIMAGNESIUM PHOSPHATE | | | | |
| | OTHER ANTICORROSIVE PIGMENT | SODIUM METAVANADATE | | | |
| | | VANADIUM PENTOXIDE | | | |
| | | SHIELDEX C303 CALCIUM SILICATE | 25 | 25 | 25 |
| | | MONOMAGNESIUM PHOSPHATE | | | |
| | | DIMAGNESIUM PHOSPHATE | | | |
| | | TRICALCIUM PHOSPHATE | | | |
| | | STRONTIUM CHROMATE | | | |
| | (e) EXTENDER PIGMENT | PRECIPITATED BARIUM SULFATE B-55 BARIUM SULFATE | | | |
| | | NO. 1 CLAY HYDRATED ALUMINUM SILICATE | | | |
| | | UNIGLOSS 1000 CALCIUM CARBONATE | | | |
| | | TALC SSS HYDRATED MAGNESIUM SILICATE | | | |
| | | GASIL HP260 SILICA POWDER | | | |
| | (f) COUPLING AGENT | TORAY Z-6011 SILANE COUPLING AGENT | 5 | 5 | 5 |
| | COATING FILM CURING CATALYST | DBTL DIBUTYLTIN COMPOUND | 0.5 | 0.5 | 0.5 |
| | SOLVENT | CYCLOHEXANONE KETONE-BASED SOLVENT | 75 | 75 | 75 |
| | | SOLVESSO 150 AROMATIC HYDROCARBON | 75 | 75 | 75 |

TABLE 4-continued

| BASE MATERIAL | | HOT-DIPPED STEEL MATERIAL | | COMPARATIVE EXAMPLE 15 | REFERENCE EXAMPLE 1 | REFERENCE EXAMPLE 2 |
|---|---|---|---|---|---|---|
| | | HOT-DIP 55% ALUMINUM-2% MAGNESIUM-1.6% SILICON-0.03% CHROMIUM-ZINC ALLOY PLATED STEEL SHEET | | | | |
| | | HOT-DIP 55% ALUMINUM-0.5% MAGNESIUM-1.6% SILICON-0.03% CHROMIUM-ZINC ALLOY PLATED STEEL SHEET | | | | |
| | | HOT-DIP 55% ALUMINUM-5% MAGNESIUM-1.6% SILICON-0.03% CHROMIUM-ZINC ALLOY PLATED STEEL SHEET | | | | |
| | | HOT-DIP 55% ALUMINUM-11% MAGNESIUM-1.6% SILICON-0.03% CHROMIUM-ZINC ALLOY PLATED STEEL SHEET | | | | |
| | | HOT-DIP 55% ALUMINUM-2% MAGNESIUM-1.6% SILICON-0.01% CHROMIUM-ZINC ALLOY PLATED STEEL SHEET | | ○ | | |
| | | HOT-DIP 55% ALUMINUM-2% MAGNESIUM-1.6% SILICON-1.1% CHROMIUM-ZINC ALLOY PLATED STEEL SHEET | | | ○ | |
| | | HOT-DIP 55% ALUMINUM-1.6% SILICON-ZINC ALLOY PLATED STEEL SHEET | | | | |
| | | HOT-DIP GALVANIZED STEEL SHEET | | | | ○ |
| COATING CONFIGURATION | | PRETREATMENT | | CHROMATE-FREE COATING PRETREATMENT | CHROMATE TREATMENT | CHROMATE TREATMENT |
| | (a) | COATING FILM-FORMING RESIN | jER1007 (30% NONVOLATILE CONTENT) EPOXY RESIN | 233 | 233 | 233 |
| | | | VYLON GK780 (NONVOLATILE CONTENT ADJUSTED TO 60%) POLYESTER RESIN | | | |
| | (b) | CROSS-LINKING AGENT | DESMOTHERM 2170 (70% NONVOLATILE CONTENT) AROMATIC BLOCKED ISOCYANATE | 43 | 43 | 43 |
| | | | DESMODUR BL3175 (75% NONVOLATILE CONTENT) ALIPHATIC BLOCKED ISOCYANATE | | | |
| | | | MYCOAT 715 (80% NONVOLATILE CONTENT) MELAMINE RESIN | | | |
| | | TOTAL OF RESIN AND CROSS-LINKING AGENT | | 100 | 100 | 100 |
| | (c) | ALKALINE EARTH METAL VANADATE AND MAGNESIUM VANADATE | CALCIUM VANADATE | 60 | | |
| | | | MAGNESIUM VANADATE | | | |
| | (d) | TRIMAGNESIUM PHOSPHATE | | | | |
| | | OTHER ANTICORROSIVE PIGMENT | SODIUM METAVANADATE | 25 | | |
| | | | VANADIUM PENTOXIDE | | | |
| | | | SHIELDEX C303 CALCIUM SILICATE | | | |
| | | | MONOMAGNESIUM PHOSPHATE | | | |
| | | | DIMAGNESIUM PHOSPHATE | | | |
| | | | TRICALCIUM PHOSPHATE | | | |
| | | | STRONTIUM CHROMATE | | | |
| | | | PRECIPITATED BARIUM SULFATE B-55 BARIUM SULFATE | | | |
| | (e) | EXTENDER PIGMENT | NO. 1 CLAY HYDRATED ALUMINUM SILICATE | | 50 | 50 |
| | | | UNIGLOSS 1000 CALCIUM CARBONATE | | 50 | 50 |
| | | | TALC SSS HYDRATED MAGNESIUM SILICATE | 75 | 75 | 75 |
| | | | GASIL HP260 SILICA POWDER | 75 | 75 | 75 |
| | (f) | COUPLING AGENT | TORAY Z-6011 SILANE COUPLING AGENT | 5 | 5 | 5 |
| | | COATING FILM CURING CATALYST | DBTL DIBUTYLTIN COMPOUND | 0.5 | 0.5 | 0.5 |
| | | SOLVENT | CYCLOHEXANONE KETONE-BASED SOLVENT | 75 | 75 | 75 |
| | | | SOLVESSO 150 AROMATIC HYDROCARBON | 75 | 75 | 75 |

Details of each blending component shown in Tables 1 to 4 are as follows.

(1) "Precipitated barium sulfate B-55": precipitated barium sulfate, available from Sakai Chemical Industry Co., Ltd.
(2) "No. 1 Clay": clay, available from Maruo Calcium Co., Ltd.
(3) "Unigloss 1000" calcium carbonate available from Maruo Calcium Co., Ltd.
(4) "talc SSS" talc available from Nippon Talc Co., Ltd.
(5) "GASIL HP260" available from INEOS SILICAS, silica powder (v) "DBTL": available from Nitto Kasei Co., Ltd., "TVS Tin Lau" (dibutyltin dilaurate, nonvolatile content: 100%)

(3) Production of Coated Steel Sheet

The aluminum zinc plated steel sheet having a thickness 0.35 mm was degreased with alkali, and an organic-inorganic hybrid treating agent "SURFCOAT EC2310" available from. Nippon Paint Surf Chemicals Co., Ltd., was applied to front and back surfaces of the steel sheet to perform a chromate-free chemical conversion treatment, followed by drying. Subsequently, each coating composition obtained as described above was applied to the back surface of the obtained steel sheet so that a dried coating film had a thickness of 7 μm, and baked at the maximum temperature of 180° C. for 30 seconds, to form a coating film on the back surface. Next, the coating composition of each of Example 1 to 18, and Comparative Examples 1 to 13 was applied to the front surface of the steel sheet so that a dried coating film had a thickness of 5 μm, and baked at the maximum temperature of 200° C. for 30 seconds, to form an undercoating film on the front surface. Further, a polyester-based top coating "NSC300HQ" available from Nippon paint Industrial Coatings Co., Ltd. was applied to the aforementioned undercoating film so that a dried coating film had a thickness of 10 μm, and baked at the maximum temperature of 210° C. for 40 seconds, to form a top coating film on the front surface. Thus, a coated steel sheet was obtained. In Reference Examples 1 and 2, a chromate treatment was performed as a chemical conversion treatment using "NRC300" available from Nippon Paint Surf Chemicals Co., Ltd., and the corresponding undercoating containing strontium chromate and the top coating were applied, baked, and dried under the same conditions.

(4) Evaluation

For the following items <1> to <8>, tests of evaluating the surface-treated steel sheets were performed. The results are shown in Tables 5 to 8.

TABLE 5

| TEST EVALUATION RESULTS | | SEPARATION METHOD | EXAMPLE 1 | EXAMPLE 2 | EXAMPLE 3 | EXAMPLE 4 | EXAMPLE 5 |
|---|---|---|---|---|---|---|---|
| | PENCIL HARDNESS | HARDNESS WHERE SEPARATION DID NOT OCCUR | 4H | 4H | 4H | 4H | 4H |
| | PROCESSING ADHESION | T BEND TAPE SEPARATION NUMBER OF T WHERE SEPARATION DID NOT OCCUR | 1TT | 1TT | 1TT | 1TT | 1TT |
| | IMPACT RESISTANCE | DUPONT IMPACT TESTER 500 g × 50 cm PERFECT SCORE OF 5 POINTS | 5 | 5 | 5 | 5 | 5 |
| | CROSS-CUT ADHESION | 1-mm LATTICE CUT TAPE SEPARATION NUMBER OF LATTICES WHERE SEPARATION DID NOT OCCUR | 100/100 | 100/100 | 100/100 | 100/100 | 100/100 |
| | RESISTANCE TO BOILING WATER | IMMERSION IN BOILING WATER OF 95° C. OR HIGHER FOR 5 HOURS BLISTER IN PLANE SURFACE, PERFECT SCORE OF 5 POINTS | 5 | 5 | 5 | 5 | 5 |
| | | CROSS-CUT ADHESION | 100/100 | 100/100 | 100/100 | 100/100 | 100/100 |
| | CHEMICAL RESISTANCE | IMMERSION IN 5% SODIUM HYDROXIDE SOLUTION FOR 24 HOURS BLISTER IN PLANE SURFACE, PERFECT SCORE OF 5 POINTS | 5 | 5 | 5 | 5 | 5 |
| | | IMMERSION IN 5% SULFURIC ACID SOLUTION FOR 24 HOURS BLISTER IN PLANE SURFACE, PERFECT SCORE OF 5 POINTS | 5 | 5 | 5 | 5 | 5 |
| | SALT SPRAY TEST | 1000 hrs RUST AND BLISTER IN PLANE SURFACE, PERFECT SCORE OF 5 POINTS | 5 | 5 | 5 | 5 | 5 |
| | | WHITE RUST IN 2T PROCESSING PART, PERFECT SCORE OF 5 POINTS | 4 | 4 | 4 | 4 | 4 |
| | | WIDTH OF RUST AND BLISTERS IN END PART AA: 2 mm OR LESS A: 4 mm OR LESS B: 6 mm OR LESS C: MORE THAN 6 mm | AA | AA | AA | AA | AA |

| | | | EXAMPLE 6 | EXAMPLE 7 | EXAMPLE 8 | EXAMPLE 9 |
|---|---|---|---|---|---|---|
| TEST EVALUATION RESULTS | PENCIL HARDNESS | HARDNESS WHERE SEPARATION DID NOT OCCUR | 4H | 4H | 4H | 4H |
| | PROCESSING ADHESION | T BEND TAPE SEPARATION NUMBER OF T WHERE SEPARATION DID NOT OCCUR | 1TT | 1TT | 1TT | 1TT |
| | IMPACT RESISTANCE | DUPONT IMPACT TESTER 500 g × 50 cm PERFECT SCORE OF 5 POINTS | 5 | 5 | 5 | 5 |
| | CROSS-CUT ADHESION | 1-mm LATTICE CUT TAPE SEPARATION NUMBER OF LATTICES WHERE SEPARATION DID NOT OCCUR | 100/100 | 100/100 | 100/100 | 100/100 |
| | RESISTANCE TO BOILING WATER | IMMERSION IN BOILING WATER OF 95° C. OR HIGHER FOR 5 HOURS BLISTER IN PLANE SURFACE, PERFECT SCORE OF 5 POINTS | 5 | 5 | 5 | 5 |
| | | CROSS-CUT ADHESION | 100/100 | 100/100 | 100/100 | 100/100 |
| | CHEMICAL RESISTANCE | IMMERSION IN 5% SODIUM HYDROXIDE SOLUTION FOR 24 HOURS BLISTER IN PLANE SURFACE, PERFECT SCORE OF 5 POINTS | 5 | 5 | 5 | 5 |
| | | IMMERSION IN 5% SULFURIC ACID SOLUTION FOR 24 HOURS BLISTER IN PLANE SURFACE, PERFECT SCORE OF 5 POINTS | 5 | 5 | 5 | 5 |

TABLE 5-continued

| SALT SPRAY TEST | 1000 hrs | RUST AND BLISTER IN PLANE SURFACE, PERFECT SCORE OF 5 POINTS | 5 | 5 | 5 | 5 |
| --- | --- | --- | --- | --- | --- | --- |
| | | WHITE RUST IN 2T PROCESSING PART, PERFECT SCORE OF 5 POINTS | 4 | 4 | 4 | 4 |
| | | WIDTH OF RUST AND BLISTERS IN END PART AA: 2 mm OR LESS A: 4 mm OR LESS B: 6 mm OR LESS C: MORE THAN 6 mm | AA | AA | AA | AA |

TABLE 6

| | | SEPARATION METHOD | EXAMPLE 10 | EXAMPLE 11 | EXAMPLE 12 | EXAMPLE 13 | EXAMPLE 14 |
|---|---|---|---|---|---|---|---|
| TEST EVALUATION RESULTS | PENCIL HARDNESS | | HARDNESS WHERE SEPARATION DID NOT OCCUR | 4H | 4H | 4H | 4H | 4H |
| | PROCESSING ADHESION | T BEND TAPE SEPARATION | NUMBER OF T WHERE SEPARATION DID NOT OCCUR | 1TT | 1TT | 1TT | 1TT | 1TT |
| | IMPACT RESISTANCE | DUPONT IMPACT TESTER 500 g × 50 cm | PERFECT SCORE OF 5 POINTS | 5 | 5 | 5 | 5 | 5 |
| | CROSS-CUT ADHESION | 1-mm LATTICE CUT TAPE SEPARATION | NUMBER OF LATTICES WHERE SEPARATION DID NOT OCCUR | 100/100 | 100/100 | 100/100 | 100/100 | 100/100 |
| | RESISTANCE TO BOILING WATER | IMMERSION IN BOILING WATER OF 95° C. OR HIGHER FOR 5 HOURS | BLISTER IN PLANE SURFACE, PERFECT SCORE OF 5 POINTS | 5 | 5 | 5 | 5 | 5 |
| | | | CROSS-CUT ADHESION BLISTER IN PLANE SURFACE, PERFECT SCORE OF 5 POINTS | 5 | 5 | 5 | 5 | 5 |
| | CHEMICAL RESISTANCE | IMMERSION IN 5% SODIUM HYDROXIDE SOLUTION FOR 24 HOURS | BLISTER IN PLANE SURFACE, PERFECT SCORE OF 5 POINTS | 5 | 5 | 5 | 5 | 5 |
| | | IMMERSION IN 5% SULFURIC ACID SOLUTION FOR 24 HOURS | | | | | | |
| | SALT SPRAY TEST | 1000 hrs | RUST AND BLISTER IN PLANE SURFACE, PERFECT SCORE OF 5 POINTS | | | | | |
| | | | WHITE RUST IN 2T PROCESSING PART, PERFECT SCORE OF 5 POINTS | 4 | 4 | 4 | 4 | 4 |
| | | | WIDTH OF RUST AND BLISTERS IN END PART AA: 2 mm OR LESS A: 4 mm OR LESS B: 6 mm OR LESS C: MORE THAN 6 mm | AA | AA | AA | AA | AA |

| | | SEPARATION METHOD | EXAMPLE 15 | EXAMPLE 16 | EXAMPLE 17 | EXAMPLE 18 |
|---|---|---|---|---|---|---|
| TEST EVALUATION RESULTS | PENCIL HARDNESS | | HARDNESS WHERE SEPARATION DID NOT OCCUR | 4H | 4H | 4H | 4H |
| | PROCESSING ADHESION | T BEND TAPE SEPARATION | NUMBER OF T WHERE SEPARATION DID NOT OCCUR | 1TT | 1TT | 1TT | 1TT |
| | IMPACT RESISTANCE | DUPONT IMPACT TESTER 500 g × 50 cm | PERFECT SCORE OF 5 POINTS | 5 | 5 | 5 | 5 |

TABLE 6-continued

| | | | | | |
|---|---|---|---|---|---|
| CROSS-CUT ADHESION | 1-mm LATTICE CUT TAPE SEPARATION | NUMBER OF LATTICES WHERE SEPARATION DID NOT OCCUR | 100/100 | 100/100 | 100/100 | 100/100 |
| RESISTANCE TO BOILING WATER | IMMERSION IN BOILING WATER OF 95° C. OR HIGHER FOR 5 HOURS | BLISTER IN PLANE SURFACE, PERFECT SCORE OF 5 POINTS CROSS-CUT ADHESION | 5 100/100 | 5 100/100 | 5 100/100 | 5 100/100 |
| CHEMICAL RESISTANCE | IMMERSION IN 5% SODIUM HYDROXIDE SOLUTION FOR 24 HOURS | BLISTER IN PLANE SURFACE, PERFECT SCORE OF 5 POINTS | 5 | 5 | 5 | 5 |
| | IMMERSION IN 5% SULFURIC ACID SOLUTION FOR 24 HOURS | BLISTER IN PLANE SURFACE, PERFECT SCORE OF 5 POINTS | 5 | 5 | 5 | 5 |
| SALT SPRAY TEST | 1000 hrs | RUST AND BLISTER IN PLANE SURFACE, PERFECT SCORE OF 5 POINTS | 5 | 5 | 5 | 5 |
| | | WHITE RUST IN 2T PROCESSING PART, PERFECT SCORE OF 5 POINTS | 4 | 4 | 4 | 4 |
| | | WIDTH OF RUST AND BLISTERS IN END PART AA: 2 mm OR LESS A: 4 mm OR LESS B: 6 mm OR LESS C: MORE THAN 6 mm | AA | AA | AA | AA |

TABLE 7

| TEST EVALUATION RESULTS | | SEPARATION METHOD | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|---|
| | PENCIL HARDNESS | HARDNESS WHERE SEPARATION DID NOT OCCUR | 4H | 4H | 4H | 4H |
| | PROCESSING ADHESION | T BEND TAPE SEPARATION NUMBER OF T WHERE SEPARATION DID NOT OCCUR | 3TT | 1TT | 1TT | 1TT |
| | IMPACT RESISTANCE | DUPONT IMPACT TESTER 500 g × 50 cm PERFECT SCORE OF 5 POINTS | 5 | 5 | 5 | 5 |
| | CROSS-CUT ADHESION | 1-mm LATTICE CUT TAPE SEPARATION NUMBER OF LATTICES WHERE SEPARATION DID NOT OCCUR | 100/100 | 100/100 | 100/100 | 100/100 |
| | RESISTANCE TO BOILING WATER | IMMERSION IN BOILING WATER OF 95° C. OR HIGHER FOR 5 HOURS BLISTER IN PLANE SURFACE, PERFECT SCORE OF 5 POINTS CROSS-CUT ADHESION | 5 | 5 | 5 | 5 |
| | | | 100/100 | 100/100 | 100/100 | 100/100 |
| | CHEMICAL RESISTANCE | IMMERSION IN 5% SODIUM HYDROXIDE SOLUTION FOR 24 HOURS BLISTER IN PLANE SURFACE, PERFECT SCORE OF 5 POINTS | 5 | 5 | 5 | 5 |
| | | IMMERSION IN 5% SULFURIC ACID SOLUTION FOR 24 HOURS BLISTER IN PLANE SURFACE, PERFECT SCORE OF 5 POINTS | 5 | 5 | 5 | 5 |
| | SALT SPRAY TEST 1000 hrs | RUST AND BLISTER IN PLANE SURFACE, PERFECT SCORE OF 5 POINTS | 5 | 5 | 5 | 5 |
| | | WHITE RUST IN 2T PROCESSING PART, PERFECT SCORE OF 5 POINTS | 3 | 3 | 2 | 4 |
| | | WIDTH OF RUST AND BLISTERS IN END PART AA: 2 mm OR LESS A: 4 mm OR LESS B: 6 mm OR LESS C: MORE THAN 6 mm | A | C | B | B |

| TEST EVALUATION RESULTS | | SEPARATION METHOD | COMPARATIVE EXAMPLE 5 | COMPARATIVE EXAMPLE 6 | COMPARATIVE EXAMPLE 7 | COMPARATIVE EXAMPLE 8 |
|---|---|---|---|---|---|---|
| | PENCIL HARDNESS | HARDNESS WHERE SEPARATION DID NOT OCCUR | 4H | 3H | 3H | 4H |
| | PROCESSING ADHESION | T BEND TAPE SEPARATION NUMBER OF T WHERE SEPARATION DID NOT OCCUR | 3TT | 1TT | 0TT | 1TT |
| | IMPACT RESISTANCE | DUPONT IMPACT TESTER 500 g × 50 cm PERFECT SCORE OF 5 POINTS | 5 | 5 | 5 | 5 |

TABLE 7-continued

| | | | | | | |
|---|---|---|---|---|---|---|
| CROSS-CUT ADHESION | 1-mm LATTICE CUT TAPE SEPARATION | NUMBER OF LATTICES WHERE SEPARATION DID NOT OCCUR | 100/100 | 100/100 | 100/100 | 100/100 |
| RESISTANCE TO BOILING WATER | IMMERSION IN BOILING WATER OF 95° C. OR HIGHER FOR 5 HOURS | BLISTER IN PLANE SURFACE, PERFECT SCORE OF 5 POINTS | 4 | 5 | 5 | 3 |
| | | CROSS-CUT ADHESION BLISTER IN PLANE SURFACE, PERFECT SCORE OF 5 POINTS | 4 | 5 | 5 | 2 |
| CHEMICAL RESISTANCE | IMMERSION IN 5% SODIUM HYDROXIDE SOLUTION FOR 24 HOURS | | 5 | 5 | 5 | 3 |
| | IMMERSION IN 5% SULFURIC ACID SOLUTION FOR 24 HOURS | BLISTER IN PLANE SURFACE, PERFECT SCORE OF 5 POINTS | 5 | 4 | 5 | 3 |
| SALT SPRAY TEST | 1000 hrs | RUST AND BLISTER IN PLANE SURFACE, PERFECT SCORE OF 5 POINTS | 2 | 2 | 2 | 2 |
| | | WHITE RUST IN 2T PROCESSING PART, PERFECT SCORE OF 5 POINTS | B | B | A | C |
| | | WIDTH OF RUST AND BLISTERS IN END PART AA: 2 mm OR LESS A: 4 mm OR LESS B: 6 mm OR LESS C: MORE THAN 6 mm | | | | |

TABLE 8

| | | | COMPARATIVE EXAMPLE 9 | COMPARATIVE EXAMPLE 10 | COMPARATIVE EXAMPLE 11 | COMPARATIVE EXAMPLE 12 |
|---|---|---|---|---|---|---|
| TEST EVALUATION RESULTS | PENCIL HARDNESS | HARDNESS WHERE SEPARATION DID NOT OCCUR | 4H | 4H | 4H | 4H |
| | PROCESSING ADHESION | T BEND TAPE SEPARATION NUMBER OF T WHERE SEPARATION DID NOT OCCUR | 1TT | 1TT | 1TT | 1TT |
| | IMPACT RESISTANCE | DUPONT IMPACT TESTER 500 g × 50 cm PERFECT SCORE OF 5 POINTS | 5 | 5 | 5 | 5 |
| | CROSS-CUT ADHESION | 1-mm LATTICE CUT TAPE SEPARATION NUMBER OF LATTICES WHERE SEPARATION DID NOT OCCUR | 100/100 | 100/100 | 100/100 | 100/100 |
| | RESISTANCE TO BOILING WATER | IMMERSION IN BOILING WATER OF 95° C. OR HIGHER FOR 5 HOURS BLISTER IN PLANE SURFACE, PERFECT SCORE OF 5 POINTS | 3 | 5 | 4 | 4 |
| | | CROSS-CUT ADHESION | 100/100 | 100/100 | 100/100 | 100/100 |
| | CHEMICAL RESISTANCE | IMMERSION IN 5% SODIUM HYDROXIDE SOLUTION FOR 24 HOURS BLISTER IN PLANE SURFACE, PERFECT SCORE OF 5 POINTS | 3 | 5 | 4 | 4 |
| | | IMMERSION IN 5% SULFURIC ACID SOLUTION FOR 24 HOURS BLISTER IN PLANE SURFACE, PERFECT SCORE OF 5 POINTS | 5 | 5 | 4 | 4 |
| | SALT SPRAY TEST | 1000 hrs RUST AND BLISTER IN PLANE SURFACE, PERFECT SCORE OF 5 POINTS | 3 | 4 | 5 | 5 |
| | | WHITE RUST IN 2T PROCESSING PART, PERFECT SCORE OF 5 POINTS | 2 | 2 | 2 | 2 |
| | | WIDTH OF RUST AND BLISTERS IN END PART AA: 2 mm OR LESS A: 4 mm OR LESS B: 6 mm OR LESS C: MORE THAN 6 mm | C | B | B | B |

| | | | COMPARATIVE EXAMPLE 13 | COMPARATIVE EXAMPLE 14 | COMPARATIVE EXAMPLE 15 | REFERENCE EXAMPLE 1 |
|---|---|---|---|---|---|---|
| TEST EVALUATION RESULTS | PENCIL HARDNESS | HARDNESS WHERE SEPARATION DID NOT OCCUR | 4H | 4H | 4H | 4H |
| | PROCESSING ADHESION | T BEND TAPE SEPARATION NUMBER OF T WHERE SEPARATION DID NOT OCCUR | 1TT | 1TT | 1TT | 1TT |
| | IMPACT RESISTANCE | DUPONT IMPACT TESTER 500 g × 50 cm PERFECT SCORE OF 5 POINTS | 5 | 5 | 5 | 5 |
| | CROSS-CUT ADHESION | 1-mm LATTICE CUT TAPE SEPARATION NUMBER OF LATTICES WHERE SEPARATION DID NOT OCCUR | 100/100 | 100/100 | 100/100 | 100/100 |
| | RESISTANCE TO BOILING WATER | IMMERSION IN BOILING WATER OF 95° C. OR HIGHER FOR 5 HOURS BLISTER IN PLANE SURFACE, PERFECT SCORE OF 5 POINTS | 4 | 5 | 5 | 5 |
| | | CROSS-CUT ADHESION | 100/100 | 100/100 | 100/100 | 100/100 |
| | CHEMICAL RESISTANCE | IMMERSION IN 5% SODIUM HYDROXIDE SOLUTION FOR 24 HOURS BLISTER IN PLANE SURFACE, PERFECT SCORE OF 5 POINTS | 4 | 5 | 5 | 5 |

TABLE 8-continued

| | | | | | |
|---|---|---|---|---|---|
| SALT SPRAY TEST | IMMERSION IN 5% SULFURIC ACID SOLUTION FOR 24 HOURS 1000 hrs | BLISTER IN PLANE SURFACE, PERFECT SCORE OF 5 POINTS | 4 | 5 | 5 | 5 |
| | | RUST AND BLISTER IN PLANE SURFACE, PERFECT SCORE OF 5 POINTS | 5 | 5 | 5 | 5 |
| | | WHITE RUST IN 2T PROCESSING PART, PERFECT SCORE OF 5 POINTS | 2 | 2 | 4 | 4 |
| | | WIDTH OF RUST AND BLISTERS IN END PART AA: 2 mm OR LESS A: 4 mm OR LESS B: 6 mm OR LESS C: MORE THAN 6 mm | B | B | AA | AA |

| | | | REFERENCE EXAMPLE 2 |
|---|---|---|---|
| TEST EVALUATION RESULTS | PENCIL HARDNESS | HARDNESS WHERE SEPARATION DID NOT OCCUR | 4H |
| | PROCESSING ADHESION | T BEND TAPE SEPARATION | NUMBER OF T WHERE SEPARATION DID NOT OCCUR PERFECT SCORE OF 5 POINTS | 1TT 5 |
| | IMPACT RESISTANCE | DUPONT IMPACT TESTER 500 g × 50 cm | 100/100 |
| | CROSS-CUT ADHESION | 1-mm LATTICE CUT TAPE SEPARATION | NUMBER OF LATTICES WHERE SEPARATION DID NOT OCCUR BLISTER IN PLANE SURFACE, PERFECT SCORE OF 5 POINTS CROSS-CUT ADHESION | 100/100 5 100/100 |
| | RESISTANCE TO BOILING WATER | IMMERSION IN BOILING WATER OF 95° C. OR HIGHER FOR 5 HOURS | BLISTER IN PLANE SURFACE, PERFECT SCORE OF 5 POINTS | 5 |
| | CHEMICAL RESISTANCE | IMMERSION IN 5% SODIUM HYDROXIDE SOLUTION FOR 24 HOURS | BLISTER IN PLANE SURFACE, PERFECT SCORE OF 5 POINTS | 5 |
| | | IMMERSION IN 5% SULFURIC ACID SOLUTION FOR 24 HOURS | | |
| | SALT SPRAY TEST | 1000 hrs | RUST AND BLISTER IN PLANE SURFACE, PERFECT SCORE OF 5 POINTS | 5 |
| | | | WHITE RUST IN 2T PROCESSING PART, PERFECT SCORE OF 5 POINTS | 3 |
| | | | WIDTH OF RUST AND BLISTERS IN END PART AA: 2 mm OR LESS A: 4 mm OR LESS B: 6 mm OR LESS C: MORE THAN 6 mm | AA |

<1> Test of Resistance to Boiling Water

Each of the surface-treated steel sheets obtained as described above was cut into a size of 5 cm×10 cm, to obtain a specimen. The specimen was immersed in boiling water of 95° C. or higher for 5 hours, and pulled out. A coating appearance on the front surface side was evaluated in accordance with ASTM D714-56 (evaluation of blisters in a plane surface). ASTM D714-56 evaluates the size (average diameter) and density of each blister as compared with a standard reference photograph and exhibits grades. The size and density of the blisters were each graded into four ranks, and evaluated in accordance with the number of point, which was obtained by combination in Table 9 below, out of perfect score of 5.

TABLE 9

|  | SIZE 8 (ABOUT 1 mm IN DIAMETER) | SIZE 6 (ABOUT 2 mm IN DIAMETER) | SIZE 4 (ABOUT 3 mm IN DIAMETER) | SIZE 2 (ABOUT 5 mm IN DIAMETER) |
| --- | --- | --- | --- | --- |
| DENSITY F | 4 | 3 | 2 | 1 |
| DENSITY M | 3 | 3 | 2 | 1 |
| DENSITY MD | 2 | 2 | 2 | 1 |
| DENSITY D | 1 | 1 | 1 | 1 |

No abnormality: 5

The specimen after immersion in boiling water of 95° C. or higher for 5 hours was subjected to a cross-cut tape adhesion test (cross-cut adhesion test), and evaluated. In the cross-cut tape adhesion test in accordance with JIS K5400 8.5.2 (1990) cross-cut tape method, 100 lattices were formed at an interval between scratches of 1 mm, and a cellophane adhesive tape was attached to the front surface and rapidly peeled. Then, the number of lattices remained on the coated surface was counted.

<2> Chemical Resistance Test

Each of the surface-treated steel sheets obtained as described above was cut into a size of 5 cm×10 cm, to obtain a specimen. The specimen was immersed in an aqueous sodium hydroxide solution having a concentration of 5% for 24 hours, pulled out, and washed with tap water. For a coating appearance on the front surface side, a blister in a plane surface was evaluated in accordance with ASTM D714-56. With reference to Table 9 used in the test of resistance to boiling water, this evaluation was scored to a perfect score of 5 points.

<3> Salt Spray Test

Each of the samples of Examples and Comparative Examples was cut into a dimension of 7 cm in width and 15 cm in length. At that time, the sample was cut alternately from the front surface and from the back surface into specimens so that the specimens each had an upward burr (cut from the back surface) and a downward burr (cut from the front surface) on cross sections thereof. The upper end and lower end parts of the coated steel sheet were sealed with a polyester tape. For the specimens, a salt spray test was performed for 1,000 hours according to a test method specified in JIS K 5400 9.1. A state of generation of white rust and blisters in the coating film of the plane surface and a cut part was observed. The rust and blisters in the plane surface were evaluated in accordance with ASTM D714-56. With reference to Table 9 used in the test of resistance to boiling water, this evaluation was scored to a perfect score of 5 points. For the rust and blisters at an end part, deterioration widths thereof at any five portions were measured, and the average thereof was scored in accordance with the following criteria.

(Criteria)

AA (very good): 2 mm or less, A (good): 4 mm or less, B (moderate): 6 mm or less, C (bad): more than 6

Each of the samples of Examples and Comparative Examples was subjected to 2T processing (in which each sample was bent by 180° by a vice with two steel sheets interposed). Then, the salt spray test was performed. A state of generation of white rust at the bending portion was observed. With reference to Table 9 above, this evaluation was scored to a perfect score of 5 points.

As shown in Comparative Example 2 in Tables 3 and 7, the coating composition of the present invention of the application was applied to a hot-dip 55% aluminum-1.6% silicon-zinc alloy plated steel sheet. In this case, the blisters in a plane surface were evaluated as a higher rank similarly to Reference Examples 1 and 2, but the cut edge corrosion resistance was evaluated as "C". As shown in Comparative Example 3, the coating composition of the present invention of the application was applied to a hot-dip galvanized steel sheet. In this case, the blisters in a plane surface were evaluated as a higher rank similarly to Reference Examples 1 and 2, but the cut edge corrosion resistance was evaluated as "B". In Examples of the present invention of the application, not only the blisters in a plane surface but also the cut edge corrosion resistance were evaluated as a higher rank similarly to Reference Examples 1 and 2. Therefore, although the mechanism was not clear, it was seen that the surface-treated steel sheet of the present invention of the application had cut edge corrosion resistance equal to or higher than that of a plated steel sheet that had been subjected to a chromate treatment. In Comparative Example 15, the corrosion resistance was high similarly to Examples, but the smoothness of the coating film was lost. Therefore, Comparative Example 15 was out of the scope of the present invention. This is considered to be because dross had been formed in a bath due to addition of excessive Cr.

<4> Pencil Hardness Test

Each of the surface-treated steel sheets obtained as described above was cut into a size of 5 cm×10 cm, to obtain a specimen. For the specimen, the pencil hardness was measured, and as a result, scratch resistance was evaluated. In accordance with a method of JIS-K 5400 8.4.1 (1993), the scratching resistance of the coating film was checked by a break of the coating film while hardness of lead of a pencil was changed. The highest hardness in which a break of the coating film was not recognized was determined as the pencil hardness of the coating film.

<5> Processing Adhesion Test

After performing adhesion bending by 180° in accordance with a method specified in JIS G3322:2012 14.2.2 bending test, a cellophane adhesive tape was pressure-bonded to the coating film surface of the processing part, and separated, and a separation state of the coating film was observed. When the separation of the coating film was recognized, the surface-treated steel sheet was again bent by 180° with a plated steel sheet with the same thickness as that of the surface-treated steel sheet interposed during adhesion bending, and the separation using a tape was repeatedly evaluated. When the coating film was not separated, the number of interposed sheets was determined as an evaluation point (for example, when the number thereof is two, the evaluation point was determined to be 2TT).

<6> Impact Resistance Test

In accordance with a method specified in JIS G3322:2012 14.2.4 impact test, a 500-g weight was dropped on a test surface from a height of 50 cm. After that, a cellophane adhesive tape was pressure-bonded to the coating film surface, and drawn in the vertical direction. Then, a separation area of the coating film was visually observed, and evaluated to a perfect score of 5 points in the according to the following criteria.

(Criteria)

5: No separation, 4: separated at 10% or less, 3: separated at 20% or less, 2: separated at 50% or less, 1: separated at more than 50%

<7> Cross-Cut Adhesion Test

In accordance with a method specified in JIS G3322:2012 14.2.5 cross-cut test, 100 lattices were formed by cutting at an interval of 1 mm, and a cellophane adhesive tape was pressure-bonded to the coating film surface, and drawn in the vertical direction. The number of lattice in which the separation did not occur was counted for evaluation.

The invention claimed is:

1. A surface-treated steel material comprising a coating film formed on a surface of a steel material through a base layer containing at least an aluminum-zinc alloy plating layer, the aluminum-zinc alloy plating layer containing Al, Zn, Si, Cr, and Mg as constituent elements thereof, wherein
an Mg content is 0.1 to 10% by mass, a Cr content is 0.02 to 1.0% by mass,
the aluminum-zinc alloy plating layer contains 0.2 to 15% by volume of an Si—Mg phase,
a ratio of a mass of Mg in the Si—Mg phase to a total mass of Mg is 3% or more,
the coating film contains a coating film-forming resin (a), a cross-linking agent (b), at least one type of vanadium compound (c) selected from the group consisting of an alkaline earth metal vanadate and magnesium vanadate, and trimagnesium phosphate (d),
the vanadium compound (c) is a compound in which an electrical conductivity of 1% by mass aqueous solution thereof at a temperature of 25° C. is 200 µS/cm to 2,000 µS/cm,
a content of the vanadium compound (c) is more than 50% by mass and 150% by mass or less relative to 100% by mass of a total of the coating film-forming resin (a) and the cross-linking agent (b),
a pH of 1% by mass aqueous solution of the vanadium compound (c) is 6.5 to 11,
a content of the trimagnesium phosphate (d) is 3 to 150% by mass relative to 100% by mass of the total of the coating film-forming resin (a) and the cross-linking agent (b),
wherein the base layer is chromate-free and, if the base layer further comprises a chemical conversion treatment layer, the chemical conversion treatment layer is chromate-free, and
wherein the surface-treated steel material has a cut edge corrosion resistance determined by measuring deterioration widths after performing a salt spray test for 1,000 hours according to a test method specified in JIS K 5400 9.1, the deterioration widths being 2 mm or less.

2. The surface-treated steel material according to claim 1, wherein the coating film further contains at least one type of extender pigment (e) selected from the group consisting of calcium carbonate, barium sulfate, clay, talc, mica, silica, alumina, and bentonite, and a content of the extender pigment (e) is 1 to 40% by mass relative to 100% by mass of the total of the coating film-forming resin (a) and the cross-linking agent (b).

3. The surface-treated steel material according to claim 1, wherein the coating film-forming resin (a) contains at least one type selected from the group consisting of a hydroxy group-containing epoxy resin having a number-average molecular weight of 2,000 to 10,000 and a glass transition temperature of 60 to 120° C., and a hydroxy group-containing polyester resin having a number-average molecular weight of 2,000 to 30,000 and a glass transition temperature of 0 to 80° C.

4. The surface-treated steel material according to claim 1, wherein
the cross-linking agent (b) contains at least one type selected from the group consisting of a blocked polyisocyanate compound (f) in which an isocyanate group of a polyisocyanate compound is blocked with an active hydrogen-containing compound, and an amino resin (g) having one or more methylol groups or imino groups on average in one molecule, and
a content of the cross-linking agent (b) is 10 to 80% by mass relative to 100% by mass of the coating film-forming resin (a).

5. The surface-treated steel material according to claim 4, wherein the polyisocyanate compound is an aromatic polyisocyanate compound.

6. The surface-treated steel material according to claim 1, wherein
the coating composition further contains at least one type of coupling agent (h) selected from the group consisting of a silane-based coupling agent, a titanium-based coupling agent, and a zirconium-based coupling agent, and
a content of the coupling agent (h) is 0.1 to 20% by mass relative to 100% by mass of the total of the coating film-forming resin (a) and the cross-linking agent (b).

7. The surface-treated steel material according to claim 1, wherein the coating film has a wet resistance value of $10^5$ to $10^{12}$ $\Omega \cdot cm^2$, wherein the wet resistance value is a direct-current resistance value of the coating film after the coating film having a dry thickness of 15 µm is wetted by a 5% salt solution at 35° C. for 1 hour.

8. The surface-treated steel material according to claim 1, wherein the Mg content at any region having a size of 4 mm in diameter and 50 nm in depth in an outermost layer having a depth of 50 nm in the aluminum-zinc alloy plating layer is less than 60% by mass.

9. The surface-treated steel material according to claim 1, wherein the Cr content in an outermost layer having a depth of 50 nm in the aluminum-zinc alloy plating layer is 100 to 500 ppm by mass.

10. The surface-treated steel material according to claim 1, wherein an alloy layer containing Al and Cr is interposed between the aluminum-zinc alloy plating layer and the steel material, and a ratio of a mass ratio of Cr in the alloy layer to a mass ratio of Cr in the aluminum-zinc alloy plating layer falls within a range of 2 to 50.

11. The surface-treated steel material according to claim 1, wherein an area ratio of the Si—Mg phase on a surface of the aluminum-zinc alloy plating layer is 30% or less.

12. The surface-treated steel material according to claim 1, wherein
an Al content in the aluminum-zinc alloy plating layer is 25 to 75% by mass,
an Si content in the aluminum-zinc alloy plating layer is 0.5 to 10% by mass relative to the Al content, and a mass ratio of Si to Mg in the aluminum-zinc alloy plating layer is 100:50 to 100:300.

13. The surface-treated steel material according to claim 1, wherein the aluminum-zinc alloy plating layer further contains 1 to 1,000 ppm by mass of Sr as a constituent element.

14. The surface-treated steel material according to claim 1, wherein the aluminum-zinc alloy plating layer further contains a component comprising at least one of Ti and B, wherein the component is present in an amount of 0.0005 to 0.1% by mass.

* * * * *